US006990085B1

(12) United States Patent
Matsuura

(10) Patent No.: US 6,990,085 B1
(45) Date of Patent: Jan. 24, 2006

(54) SUBSCRIBER UNIT AND RADIO BASE STATION RECOGNITION METHOD

(75) Inventor: Hirokazu Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/394,771

(22) Filed: Sep. 10, 1999

(30) Foreign Application Priority Data

Jan. 9, 1999 (JP) .................................. 11-010285

(51) Int. Cl.
*H04Q 7/00* (2006.01)
(52) U.S. Cl. ..................... 370/329; 370/341; 455/435.1
(58) Field of Classification Search ................ 370/329, 370/330, 335–344; 455/433–435.2, 524, 455/525, 3.01
See application file for complete search history.

(56) References Cited

U.S. PATENT DOCUMENTS

| | | | | |
|---|---|---|---|---|
| 5,379,451 A | * | 1/1995 | Nakagoshi et al. ...... | 455/435.1 |
| 5,588,043 A | * | 12/1996 | Tiedemann, Jr. et al. | 455/435.1 |
| 5,613,199 A | * | 3/1997 | Yahagi ..................... | 455/426.1 |
| 5,842,127 A | * | 11/1998 | Pashtan et al. .......... | 455/435.3 |
| 6,018,666 A | * | 1/2000 | Chavez, Jr. ................. | 455/465 |
| 6,075,993 A | * | 6/2000 | Kawamoto ............... | 455/456.3 |
| 6,125,138 A | * | 9/2000 | Kumagai ..................... | 375/219 |

FOREIGN PATENT DOCUMENTS

| JP | 64-16129 | 1/1989 |
|---|---|---|
| JP | 9-331289 | 12/1997 |

* cited by examiner

*Primary Examiner*—Chau Nguyen
*Assistant Examiner*—Soon D. Hyun
(74) *Attorney, Agent, or Firm*—Katten Muchin Rosenman LLP

(57) ABSTRACT

A subscriber unit and a radio base station recognition method whereby the most serviceable radio base station can be automatically recognized at a fixed location. Radio base station detecting unit detects, in a continuous receive mode, radio base stations from which radio wave can be received. Area number recognizing unit recognizes an area number of radio base stations of which location registration is permitted, and radio base station extracting unit extracts radio base stations with the area number from among the detected radio base stations. Synchronization control unit establishes synchroneity with a radio base station of highest reception level among the extracted radio base stations.

11 Claims, 24 Drawing Sheets

SUBSCRIBER UNIT AND RADIO BASE STATION RECOGNITION METHOD

BACKGROUND OF THE INVENTION (1) Field of the Invention

The present invention relates to a subscriber unit and a radio base station recognition method, and more particularly, to a subscriber unit for performing radio communication at a fixed location and a radio base station recognition method which enables a subscriber unit for performing radio communication at a fixed location to recognize a radio base station.

(2) Description of the Related Art

Currently, in the field of radio communications, attempts have been made on a nationwide scale to effectively use radio frequencies, and digitization and personalization of communications are rapidly spreading. Also, there have been developed a diversity of data transmissions and their related services and demands therefor are more and more increasing.

In recent years, WLL (Wireless Local Loop) is attracting attention which permits radio communications to be established between a subscriber-side exchange and a subscriber's home, which are conventionally connected by wire.

FIG. 24 illustrates a WLL system configuration. The WLL system comprises a public network 40 including an exchange 41, a base station control device 50, and a plurality of zones Z1, Z2a and Z2b.

The zone Z1 includes a radio base station 101 and a subscriber unit SU11. The zone Z2a includes a radio base station 201 and a subscriber unit SU21, and the zone Z2b includes a radio base station 202 and a subscriber unit SU22. A telephone is connected to each of the subscriber units SU11, SU21 and SU22.

The zones are each assigned an area number associated with location registration and accounting, and the zone Z1 belongs to an area 100 and the zones Z2a and Z2b to an area 200.

The base station control device 50 connects the exchange 41 and each of the radio base stations 101, 201 and 202 by a wireline link and controls the radio base stations 101, 201 and 202. Each of the subscriber units SU11, SU21 and SU22 is connected to a corresponding one of the radio base stations 101, 201 and 202 by a wireless link and performs subscriber radio control for establishing wireless connection between its associated telephone and the corresponding radio base station 101, 201, 202.

As such WLL system, PHS (Personal Handyphone System)-WLL system in particular, which uses a data transmission method complying with PHS, has been developed. Conventional subscriber units therefore have a network-initiated type construction like PHS terminals.

For example, a subscriber unit is so constructed as to operate after a permission level for waiting (state capable of transmission/reception) and a waiting selection level are specified from the network side (base station control device), as is the case with PHS terminals.

The waiting permission level is a prescribed level based on which the subscriber unit is set outside or inside area. If the radio wave from a radio base station satisfies the prescribed level, the subscriber unit is judged to be inside area and thus a call can be established (for example, an antenna mark is displayed on the display screen of the PHS terminal). If the radio wave has a level lower than the prescribed level, then the subscriber unit is judged to be outside area and a call cannot be established because the speech quality lowers due to increased error rate.

The waiting selection level is a prescribed level used to determine whether to search for nearby radio base stations or not. When the radio wave from a radio base station becomes out of synchronism to a degree lower than the prescribed level notified from the network side, the subscriber unit searches for nearby base stations.

In the aforementioned PHS-WLL system, however, since the subscriber unit is a fixed station, it is associated with restrictions that pose no problem with the conventional PHS terminal because of the condition that the conventional PHS terminal is mobile.

For example, in the PHS terminal, if the level of the radio wave drops below the waiting selection level as the PHS terminal moves, the operation for searching for nearby stations is initiated. However, the subscriber unit is not moved, and accordingly, the nearby station search function is not performed. Thus, if the radio base station with which synchroneity is established stops transmitting radio wave, the subscriber unit establishes synchroneity with another base station, but when the original radio base station is restored, the subscriber unit is unable to recognize the restored radio base station.

Also, when a radio base station is additionally installed at a location adjacent to the subscriber unit, the subscriber unit may establish synchroneity with the added radio base station, giving rise to a problem that services cannot be provided to a subscriber who should originally be accommodated.

Further, when the area numbers are rearranged (reassigned), location registration cannot be terminated because the subscriber unit does not have an area number recognition function.

SUMMARY OF THE INVENTION

One object of the present invention is to provide a subscriber unit capable of always recognizing radio base stations that a network side permits to use and also automatically recognizing the most serviceable radio base station.

To achieve the above object, there is provided a subscriber unit for performing radio communication at a fixed location. The subscriber unit comprises radio base station detecting means for detecting, in a continuous receive mode, radio base stations from which radio wave can be received, area number recognizing means for recognizing an area number of radio base stations of which location registration is permitted, radio base station extracting means for extracting radio base stations with the area number from among the detected radio base stations, and synchronization control means for establishing synchroneity with a radio base station of highest reception level among the extracted radio base stations.

Another object of the present invention is to provide a radio base station recognition method which permits radio base stations the use of which is permitted by a network side to be recognized at all times and also permits automatic recognition of the most serviceable radio base station.

To achieve the object, there is provided a radio base station recognition method which enables a subscriber unit for performing radio communication at a fixed location to recognize a radio base station. The radio base station recognition method comprises detecting, in a continuous receive mode, radio base stations from which radio wave can be received, recognizing an area number of radio base stations of which location registration is permitted, extracting radio base stations with the area number from among the detected radio base stations, and establishing synchroneity with a radio base station of highest reception level among the extracted radio base stations.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
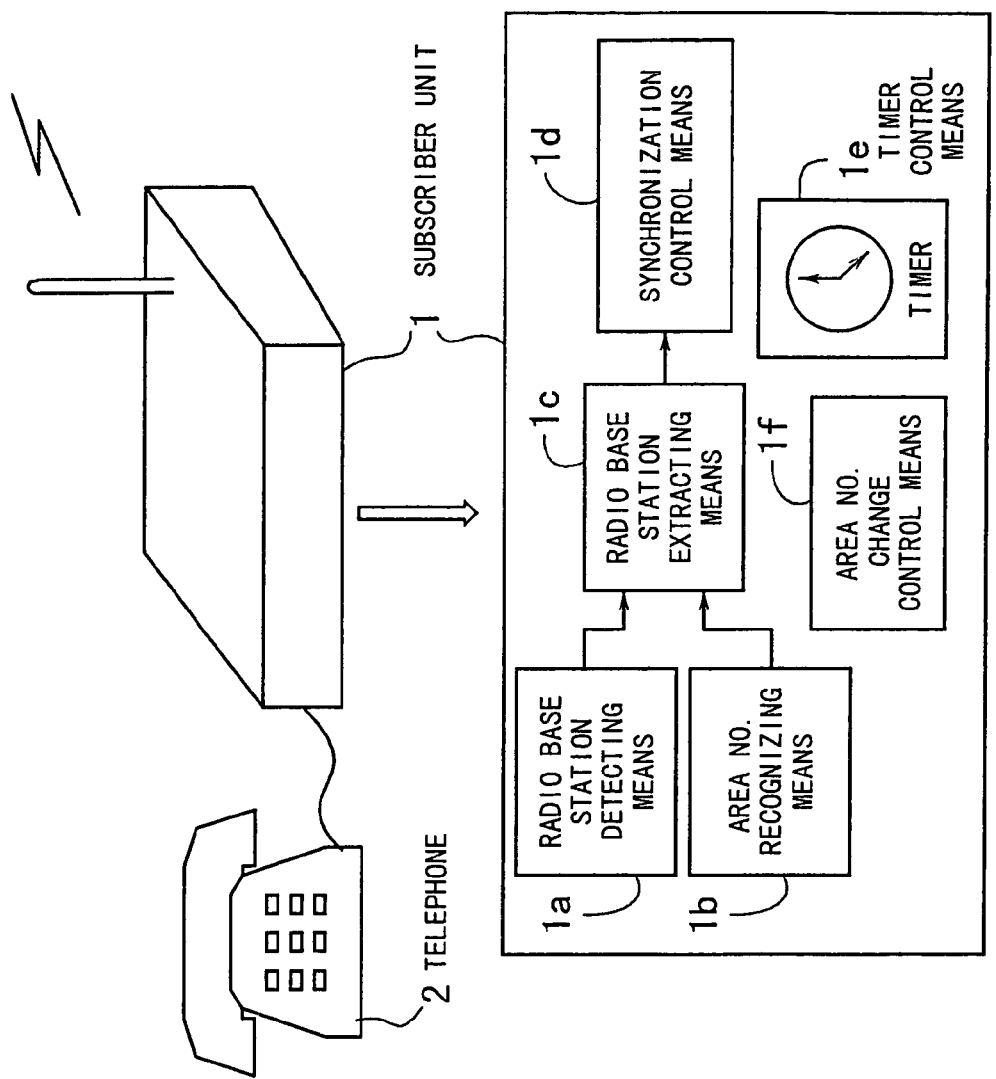
FIG. 1 is a diagram illustrating the principle of a subscriber unit according to the present invention.

Embodiments of the present invention will be hereinafter described with reference to the drawings. FIG. 1 illustrates the principle of a subscriber unit according to the present invention. A subscriber unit (SU) 1 is connected to a telephone 2 or the like (the unit may alternatively be connected to information terminal equipment such as a personal computer) and performs radio communication at a fixed location without being moved.

Radio base station detecting means $1a$ detects and stores, in a continuous receive mode, radio base stations from which radio wave can be received (the number of radio base stations to be detected is set beforehand). Specifically, identification numbers (hereinafter "IDs") of radio base stations are detected. In each of subsequent control operations, radio base stations are recognized by their IDs.

The continuous receive mode is a mode from which the subscriber unit switches to an intermittent receive mode with respect to an incoming group to which the subscriber unit belongs, and during this period of time the subscriber unit receives a variety of radio channel notification information.

Area number recognizing means $1b$ recognizes an area number of radio base stations of which location registration is permitted. In the recognition control, a location registration request is sent to the radio base stations with the IDs detected by the radio base station detecting means $1a$, and if a location registration denial signal is received, the corresponding radio base station is judged to be outside the area.

On the other hand, if a location registration acceptance signal is received, the corresponding radio base station is judged to be inside the area and the area number associated therewith is recognized and stored. To store the area number, the area number and the ID are written in a nonvolatile memory in a manner correlated with each other.

Radio base station extracting means $1c$ extracts radio base stations having the stored area number, from among the radio base stations with the detected IDs.

Synchronization control means $1d$ establishes synchroneity with a radio base station of which the reception level is highest, from among the extracted radio base stations. Namely, synchroneity is established with a radio base station of highest reception level from among the radio base stations of which location registration has been permitted, whereupon the subscriber unit enters a waiting state.

Before radio base stations are extracted by the radio base station extracting means $1c$ (before a radio base station of which location registration is permitted and of which the reception level is highest is found), the synchronization control means $1d$ establishes synchroneity with a radio base station of highest reception level from among the radio base stations with the detected IDs, and during this period of time the area number recognizing means $1b$ performs the location registration control.

If there is no radio base station of which location registration is permitted, timer control means $1e$ starts a timer. The synchronization control means $1d$ maintains synchroneity with the radio base station of highest reception level among the detected radio base stations until the timer signals time-out. On recognizing change of the area number, area number change control means 1f controls change of the area number recognized by the area number recognizing means 1b.

Figure 2:
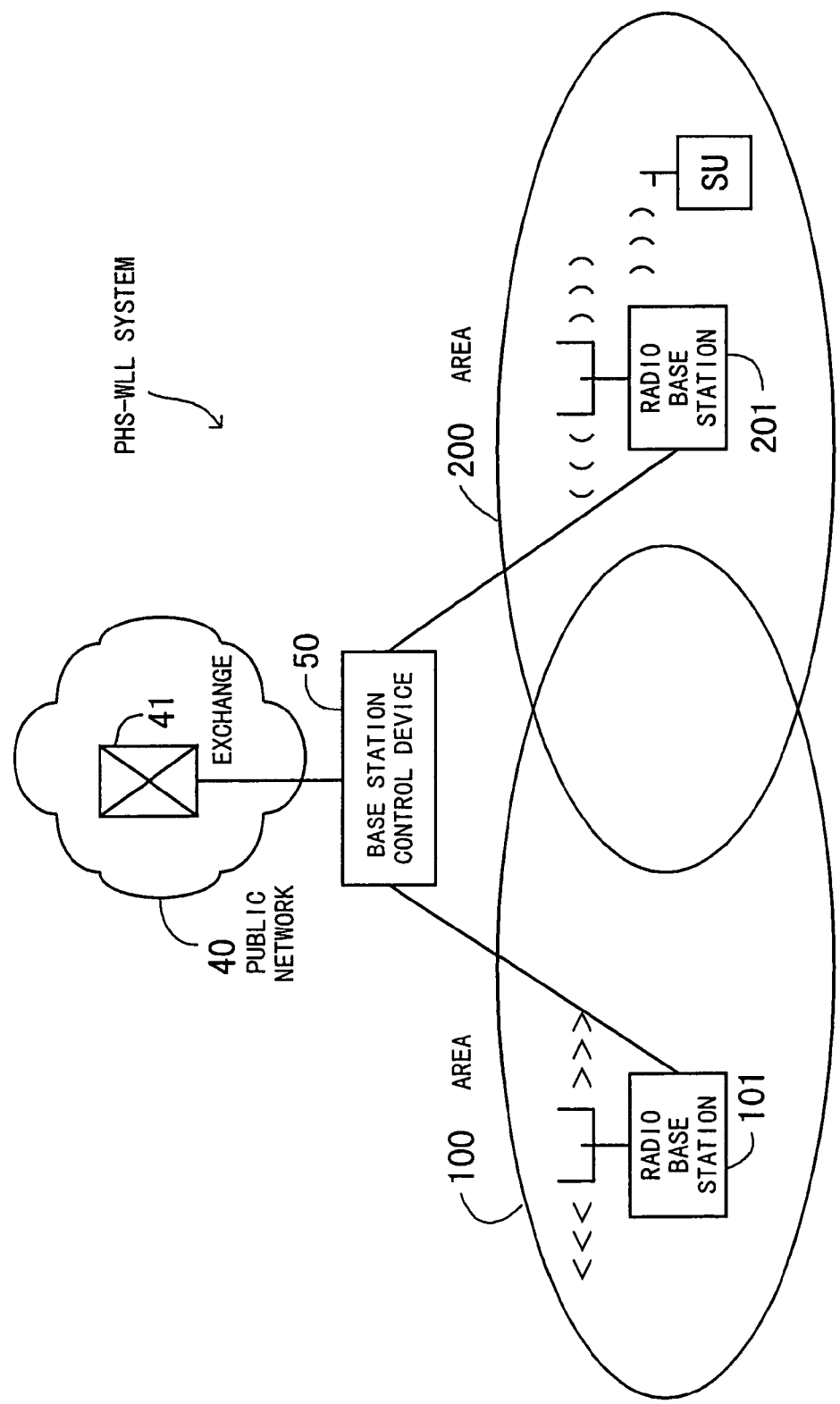
FIG. 2 is a diagram illustrating a problem with a conventional PHS-WLL system encountered when the radio wave from a radio base station of highest reception level stops.
Figure 3:
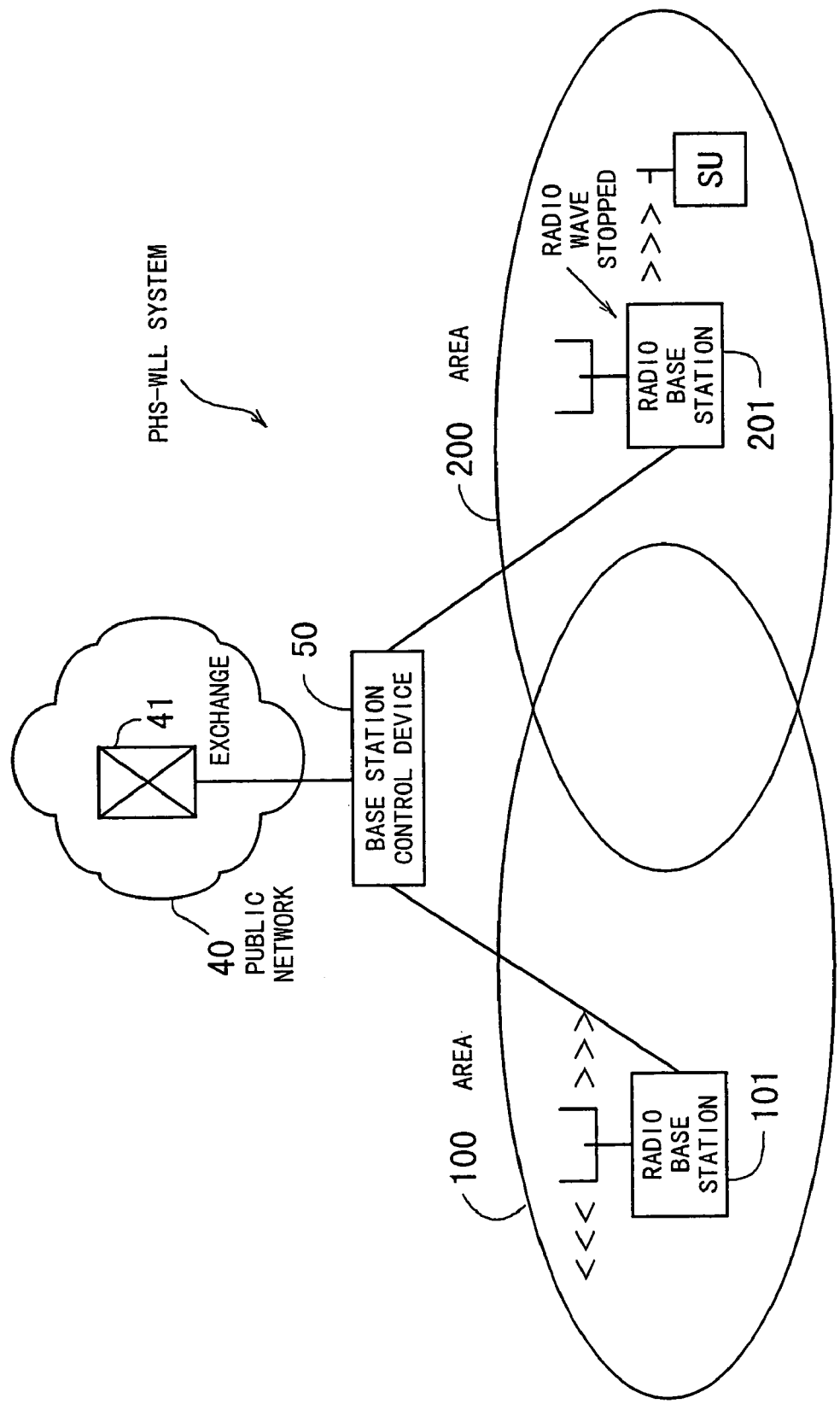
FIG. 3 is a diagram similarly illustrating the problem with the conventional PHS-WLL system encountered when the radio wave from the radio base station of highest reception level stops.
Figure 4:
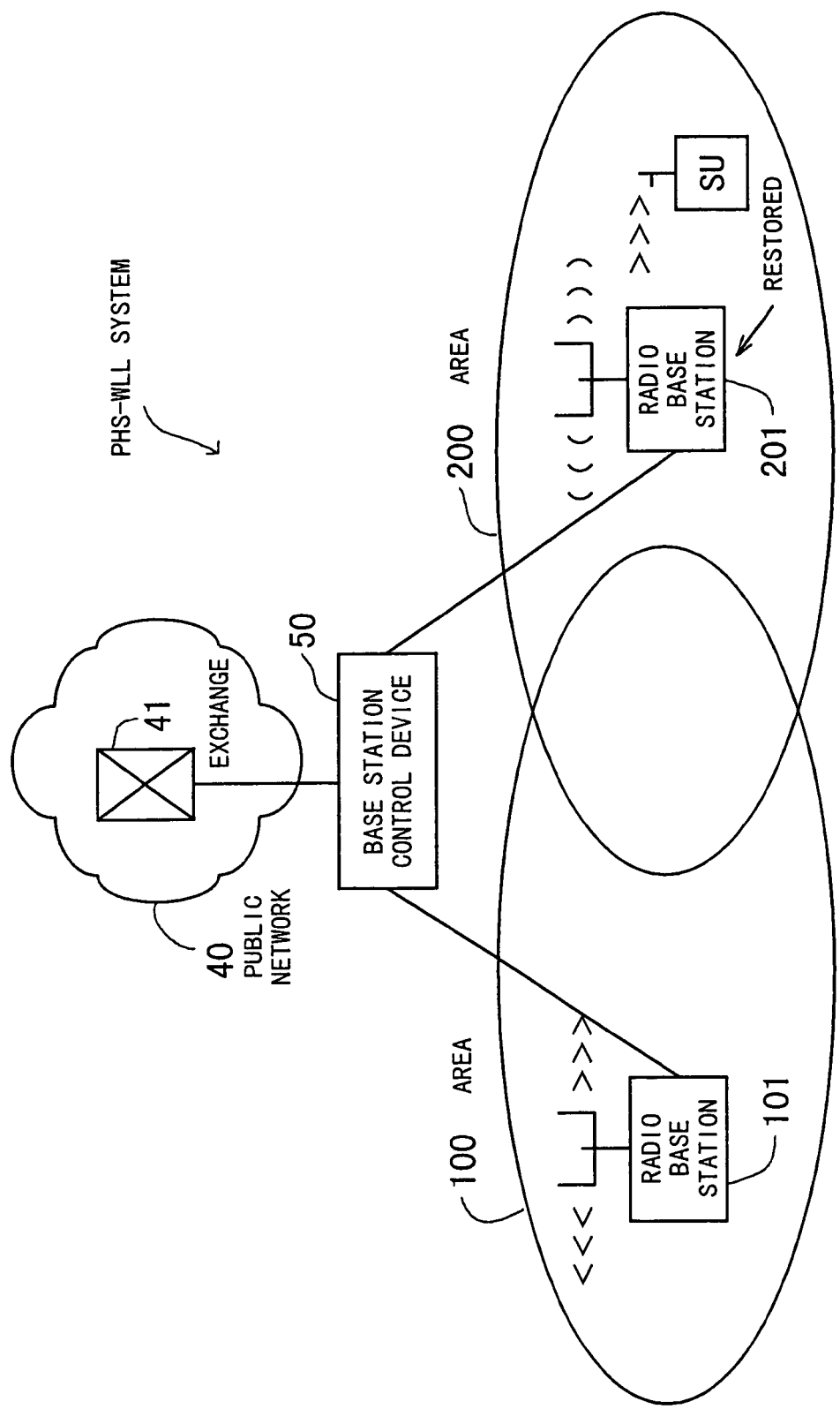
FIG. 4 is a diagram similarly illustrating the problem with the conventional PHS-WLL system encountered when the radio wave from the radio base station of highest reception level stops.

The operation according to the present invention will be now described in detail, by contrast with a problem associated with a conventional PHS-WLL system. FIGS. 2 to 4 illustrate the problem with the conventional PHS-WLL system encountered when the radio wave from the radio base station of highest reception level stops.

In FIG. 2, the PHS-WLL system comprises a public network 40 including an exchange 41, a base station control device 50, an area 100 including a radio base station 101, and an area 200 including a radio base station 201 and a subscriber unit SU (in FIG. 2 and the following figures, a telephone or the like connected to the subscriber unit is omitted).

The base station control device 50 connects the exchange 41 and each of the radio base stations 101 and 201 by a wireline link, and the subscriber unit SU is connected to the radio base station 201 by a wireless link. Namely, synchroneity is established between the subscriber unit SU and the radio base station 201 of highest reception level.

FIG. 3 illustrates a state in which the radio wave from the radio base station 201 has stopped. Since the radio wave from the radio base station 201 has stopped, the subscriber unit SU establishes synchroneity with the radio base station 101.

FIG. 4 illustrates a state in which the radio base station 201 has been restored. The subscriber unit SU is unable to be disconnected from the radio base station 101 unless the reception level thereof drops below a prescribed level, and therefore, maintains synchroneity with the radio base station 101 even after the restoration of the radio base station 201.

Consequently, a subscriber whom the radio base station 101 should originally accommodate cannot be fully serviced. Also, the subscriber unit SU fails to provide satisfactory speech quality because the reception level of the radio base station 101 is low, even though the reception level is not below the prescribed level.

Referring now to FIGS. 5 through 8, how the subscriber unit 1 according to the present invention operates when a radio base station of highest reception level, among a plurality of radio base stations located in an area, stops transmitting radio wave and is thereafter restored will be described.

Figure 5:
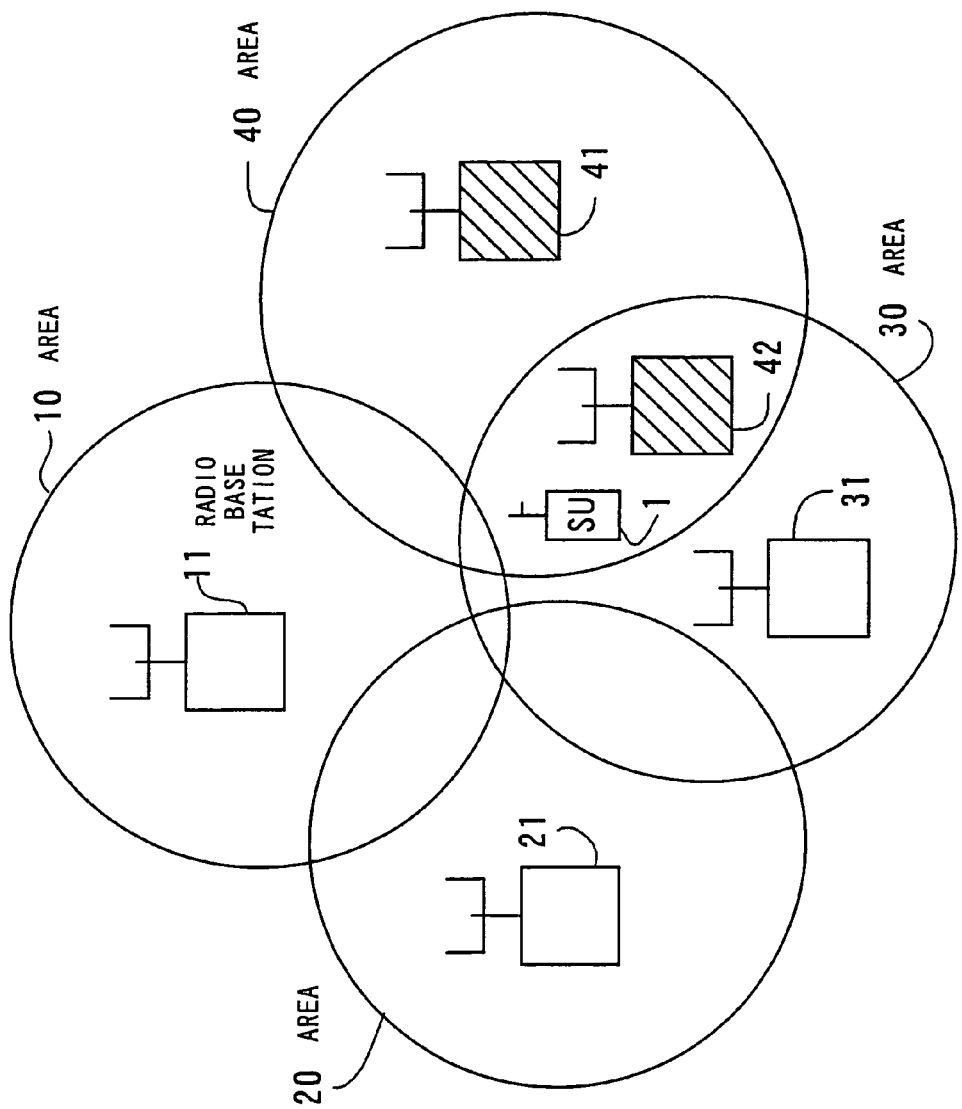
FIG. 5 is a diagram showing an arrangement of areas in which the subscriber unit is located.

FIG. 5 shows an arrangement of areas in which the subscriber unit 1 is located. In the figure, the public network, the base station control device, etc. are omitted. Radio base stations 11 to 31 are located in respective areas 10 to 30, and radio base stations 41 and 42 are located in an area 40. The subscriber unit 1 is located as illustrated in the figure.

It is assumed that the radio base stations 41 and 42 are base stations of which the location registration with respect to the subscriber unit 1 is permitted by the network side (base station control device), and that the radio base station 41 once stops transmitting radio wave and is thereafter restored.

Figure 6:
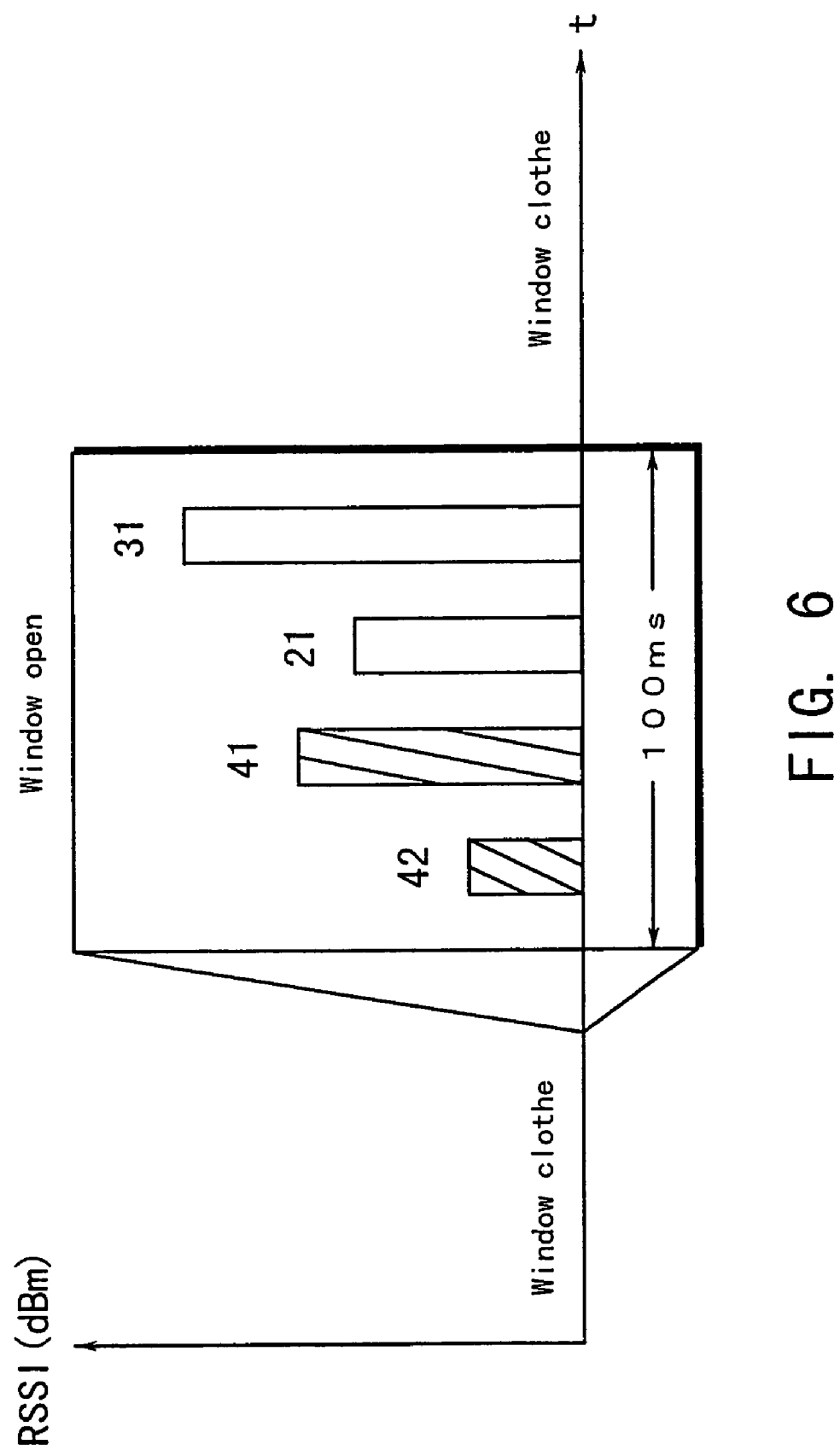
FIG. 6 is a diagram showing reception levels.

FIG. 6 shows reception levels, wherein the vertical axis indicates RSSI (dBm) and the horizontal axis indicates time t. Assuming that the subscriber unit 1 detects four IDs of radio base stations within 100 ms of the continuous receive mode, the figure shows the reception levels of the four radio base stations detected in this case. The reception level of the radio base station 31 is the highest, those of the radio base stations 41 and 21 are the second and third highest, respectively, and the reception level of the radio base station 42 is the lowest.

Figure 7:
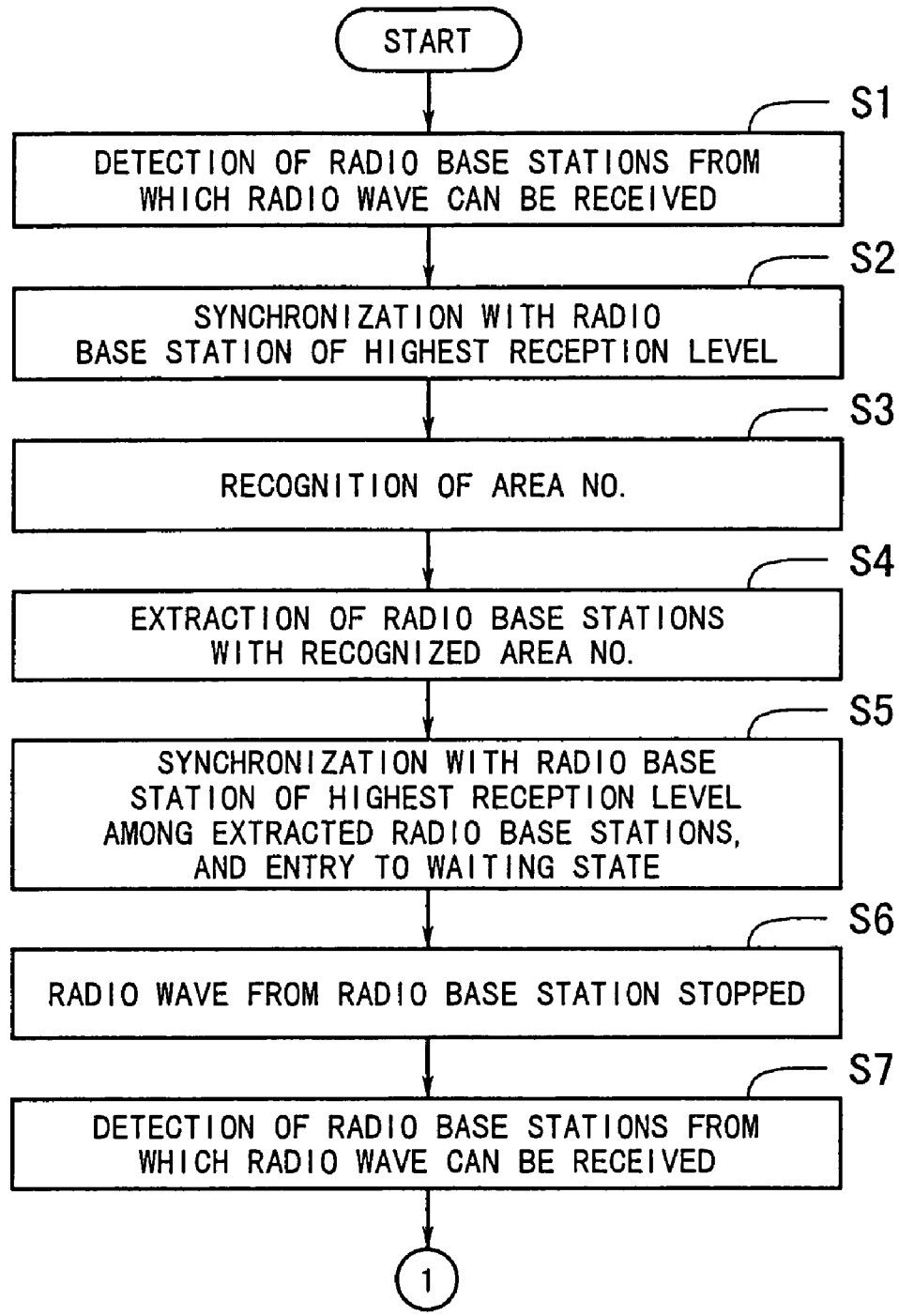
FIG. 7 is a flowchart showing an operation procedure of the subscriber unit.
Figure 8:
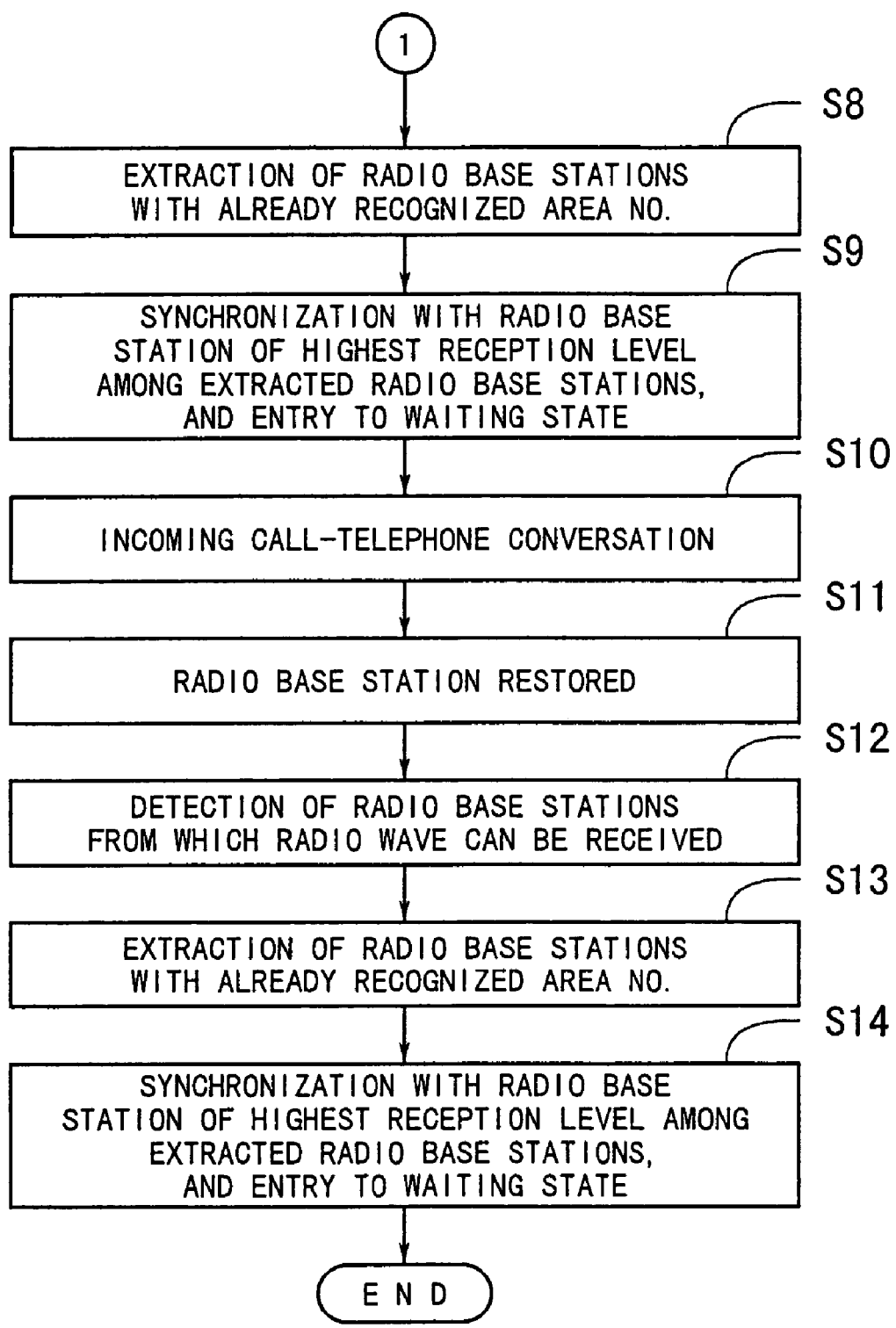
FIG. 8 is a flowchart showing the operation procedure of the subscriber unit.

FIGS. 7 and 8 are flowcharts illustrating an operation procedure of the subscriber unit 1. The operation described below is based on the assumptions explained with reference to FIGS. 5 and 6.

[S1] When the power supply to the subscriber unit 1 is switched on, the subscriber unit enters the continuous receive mode for 100 ms. During the continuous receive mode, the radio base station detecting means 1a detects IDs of radio base stations from which radio wave can be received. In the aforesaid example, the four IDs of the radio base stations 21, 31, 41 and 42 are detected and stored.

Each radio base station is standardized such that it never fails to transmit one burst control signal (including information about its own ID etc.) within the 100 ms (ARIB STD28).

[S2] The synchronization control means 1d establishes synchroneity with the radio base station 31 of highest reception level among the detected radio base stations 21, 31, 41 and 42.

[S3] The area number recognizing means 1b performs control for the recognition of the area number of radio base stations of which location registration is permitted. In this control procedure, first, a location registration request is sent to the radio base station 31 of which the reception level is highest.

The subscriber unit 1 is not permitted the location registration of the radio base station 31, as mentioned above. Accordingly, the subscriber unit 1 receives a location registration denial signal and judges the radio base station 31 to be outside the area.

Subsequently, the area number recognizing means 1b sends a location registration request to the radio base station 41 of the second highest reception level. Since the subscriber unit 1 is permitted the location registration of the radio base station 41, it receives a location registration acceptance signal and judges the radio base station 41 to be inside the area.

The above operation is performed also with respect to the radio base stations 21 and 42. Location registration of the radio base station 21 is not permitted, while location registration of the radio base station 42 is permitted. In consequence, the area number recognizing means 1b judges the radio base stations 41 and 42 to be inside the area and recognizes their area number 40.

The area number 40 and the IDs of the radio base stations 41 and 42 are stored in the nonvolatile memory in a manner correlated with each other.

[S4] The radio base station extracting means 1c extracts the radio base stations 41 and 42 having the stored area number 40, from the radio base stations 21, 31, 41 and 42 with the detected IDs.

[S5] The synchronization control means 1d establishes synchroneity with the radio base station 41 of highest reception level among the extracted radio base stations 41 and 42, whereupon the subscriber unit enters the waiting state.

[S6] If, during the waiting state, the radio base station 41 stops transmitting radio wave, the subscriber unit 1 becomes out of synchronism with respect to the radio base station 41.

[S7] The subscriber unit 1 switches to the continuous receive mode, so that the radio base station detecting means 1a again detects IDs of the radio base stations from which radio wave can be received. In this case, the radio base stations 21, 31 and 42 are detected.

[S8] The radio base station extracting means 1c extracts the radio base station 42 with the area number 40 which has already been recognized and stored in Step S3, from the radio base stations 21, 31 and 42 with the detected IDs.

[S9] The synchronization control means 1*d* establishes synchroneity with the radio base station 42, whereupon the subscriber unit enters the waiting state.

[S10] It is assumed that during the waiting state, an incoming call is received, in which case the subscriber unit 1 enters a state of telephone conversation with the calling unit via the radio base station 42.

[S11] It is also assumed that during the telephone conversation, the radio base station 41, which has stopped transmitting radio wave, is restored.

[S12] After the telephone conversation ends, the subscriber unit 1 switches to the continuous receive mode, so that the radio base station detecting means 1*a* again detects IDs of the radio base stations from which radio wave can be received, for the period of 100 ms. Specifically, the radio base stations 21, 31, 41 and 42 are detected.

[S13] The radio base station extracting means 1*c* extracts the radio base stations 41 and 42 with the area number 40 which has already been recognized and stored in Step S3, from the radio base stations 21, 31, 41 and 42 with the detected IDs.

[S14] The synchronization control means 1*d* establishes synchroneity with the radio base station 41 of highest reception level from among the extracted radio base stations 41 and 42, and the subscriber unit enters the waiting state.

As described above, the subscriber unit 1 according to the present invention is constructed so as to be able to automatically recognize a radio base station to which it should be connected. Thus, the subscriber unit, which, though, is a fixed station, can search for nearby base stations like PHS terminals, and even in cases where the radio base station once stops transmitting radio wave and is thereafter restored, the subscriber unit can establish synchroneity with the restored radio base station.

Referring now to FIGS. 9 through 12, how the subscriber unit 1 according to the present invention operates when one and only radio base station located in an area stops transmitting radio wave and is thereafter restored will be described.

Figure 9:
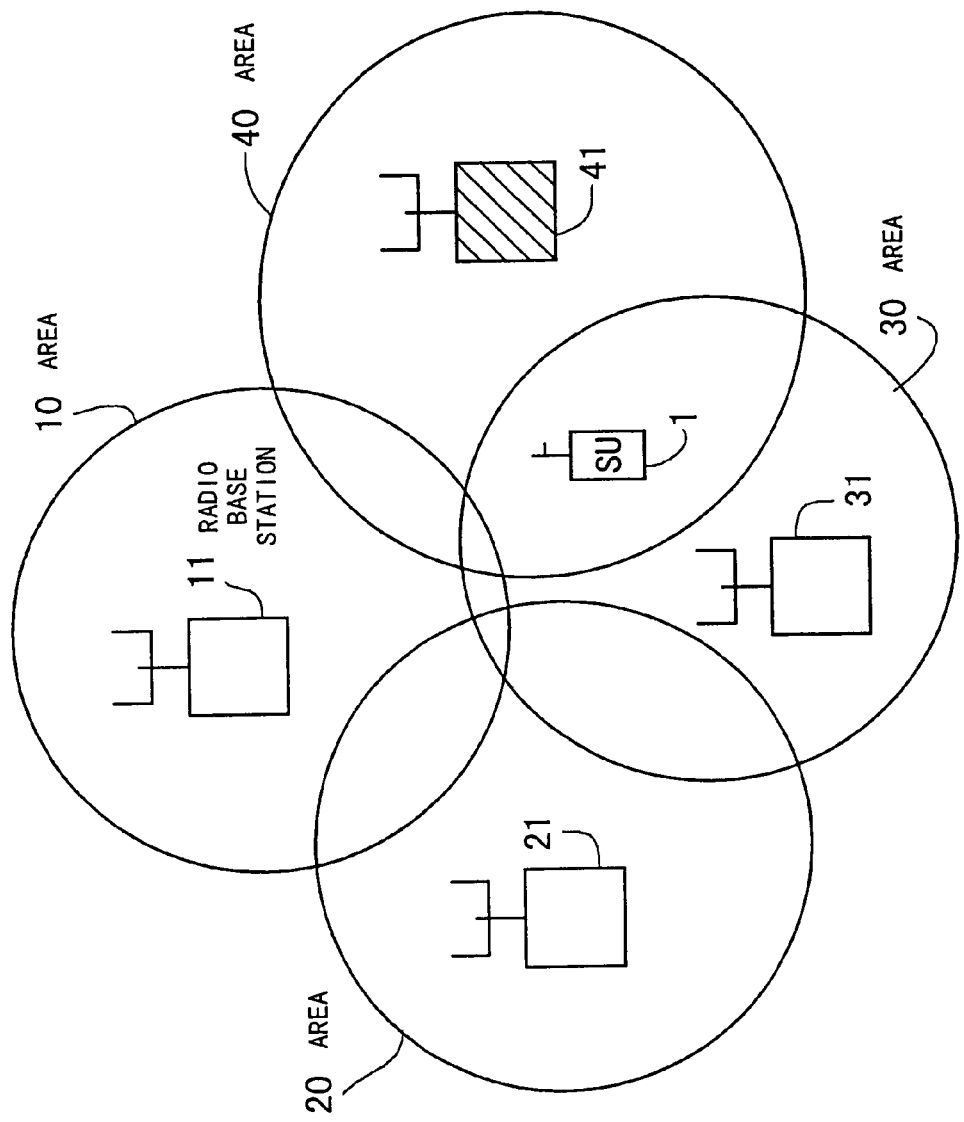
FIG. 9 is a diagram showing an arrangement of areas in which the subscriber unit is located.

FIG. 9 shows an arrangement of areas in which the subscriber unit 1 is located. The radio base stations 11 to 41 are located in the respective areas 10 to 40, and the subscriber unit 1 is located as illustrated in the figure.

It is assumed that the radio base station 41 is a base station of which the location registration with respect to the subscriber unit 1 is permitted by the network side, and that the radio base station 41 once stops transmitting radio wave and is thereafter restored.

Figure 10:
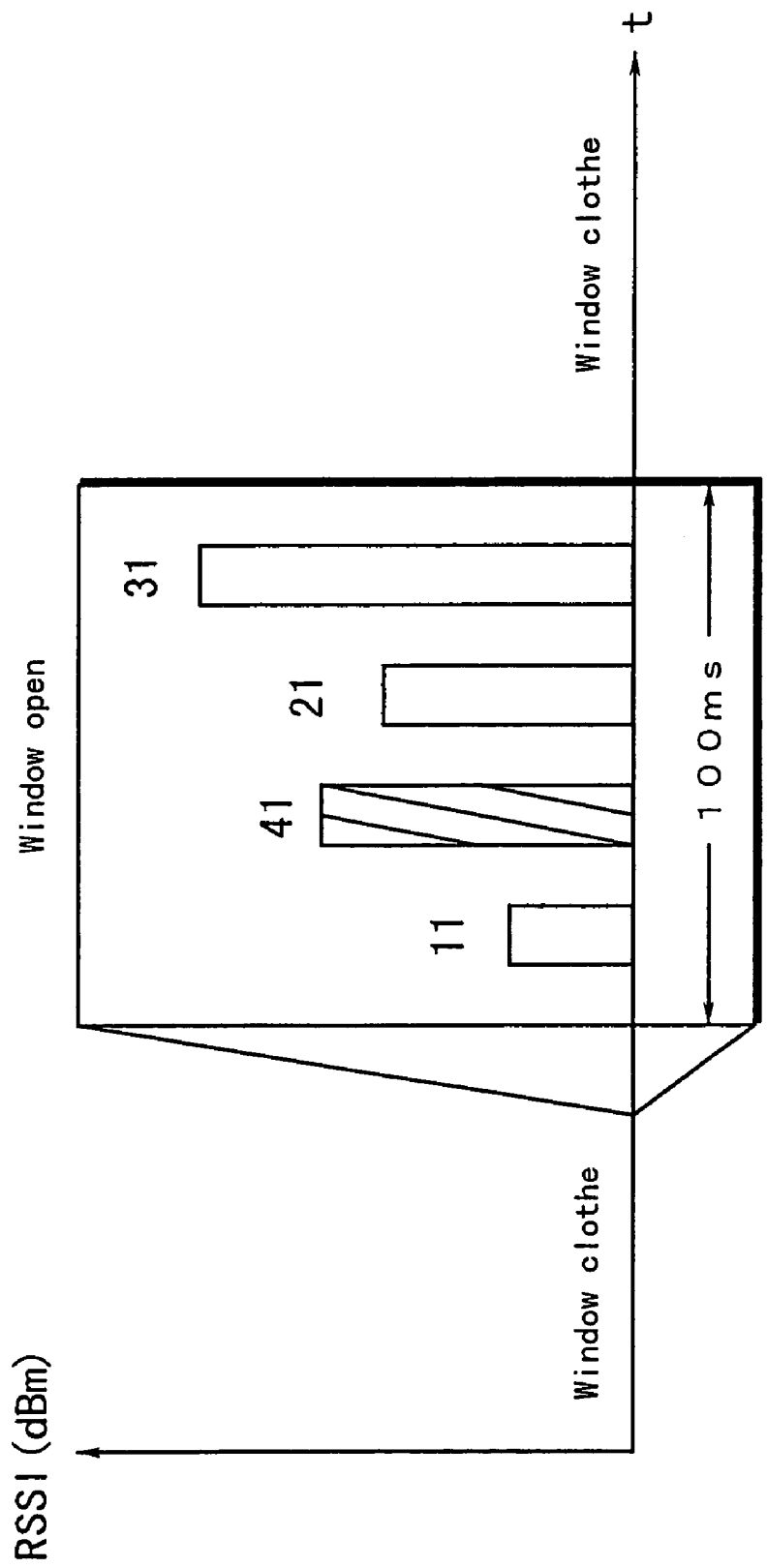
FIG. 10 is a diagram showing reception levels.

FIG. 10 shows reception levels, wherein the vertical axis indicates RSSI (dBm) and the horizontal axis indicates time t. Assuming that the subscriber unit 1 detects four IDs of radio base stations within 100 ms of the continuous receive mode, the figure shows the reception levels of the four radio base stations detected in this case. The reception level of the radio base station 31 is the highest, those of the radio base stations 41 and 21 are the second and third highest, respectively, and the reception level of the radio base station 11 is the lowest.

Figure 11:
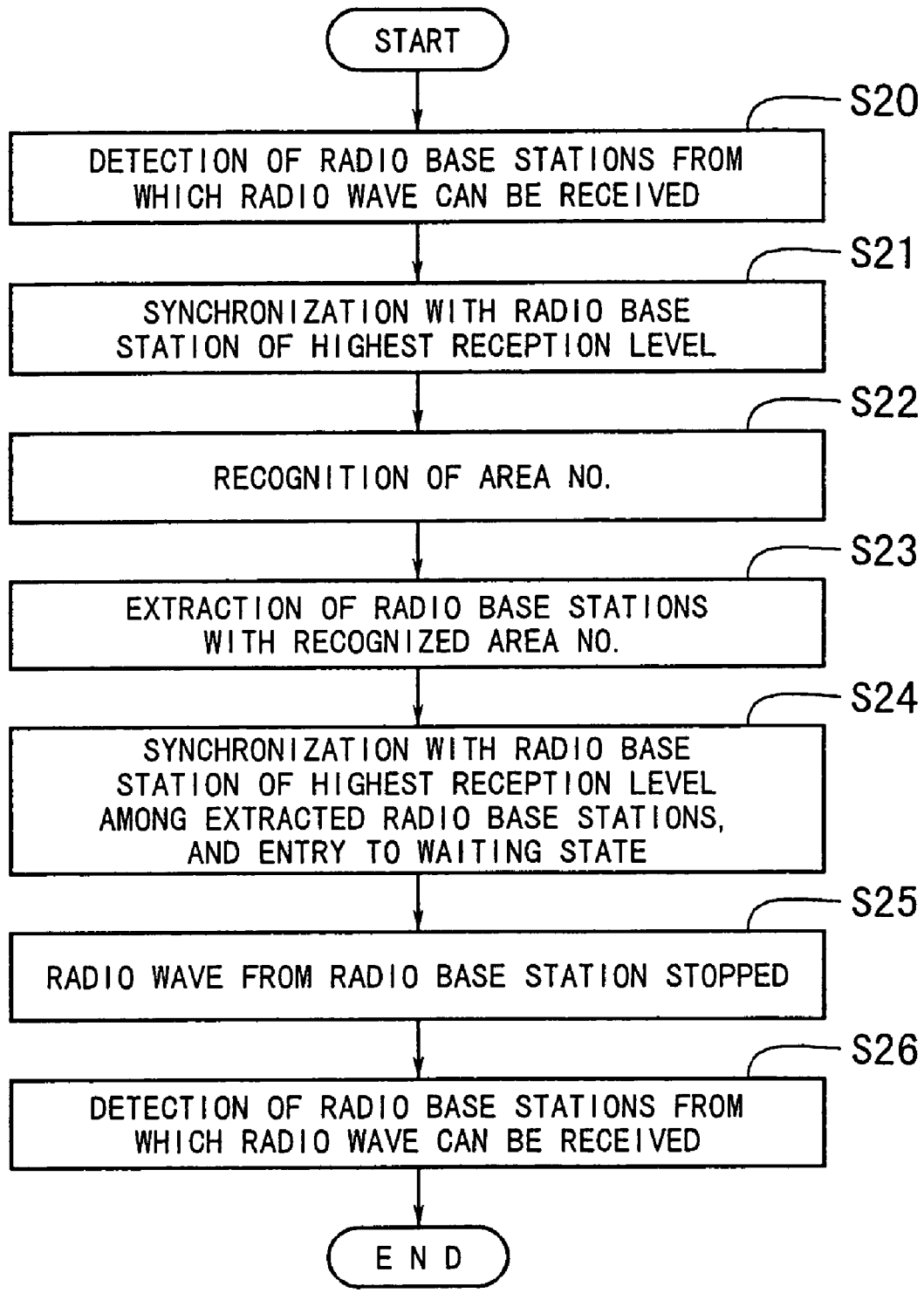
FIG. 11 is a flowchart showing an operation procedure of the subscriber unit.
Figure 12:
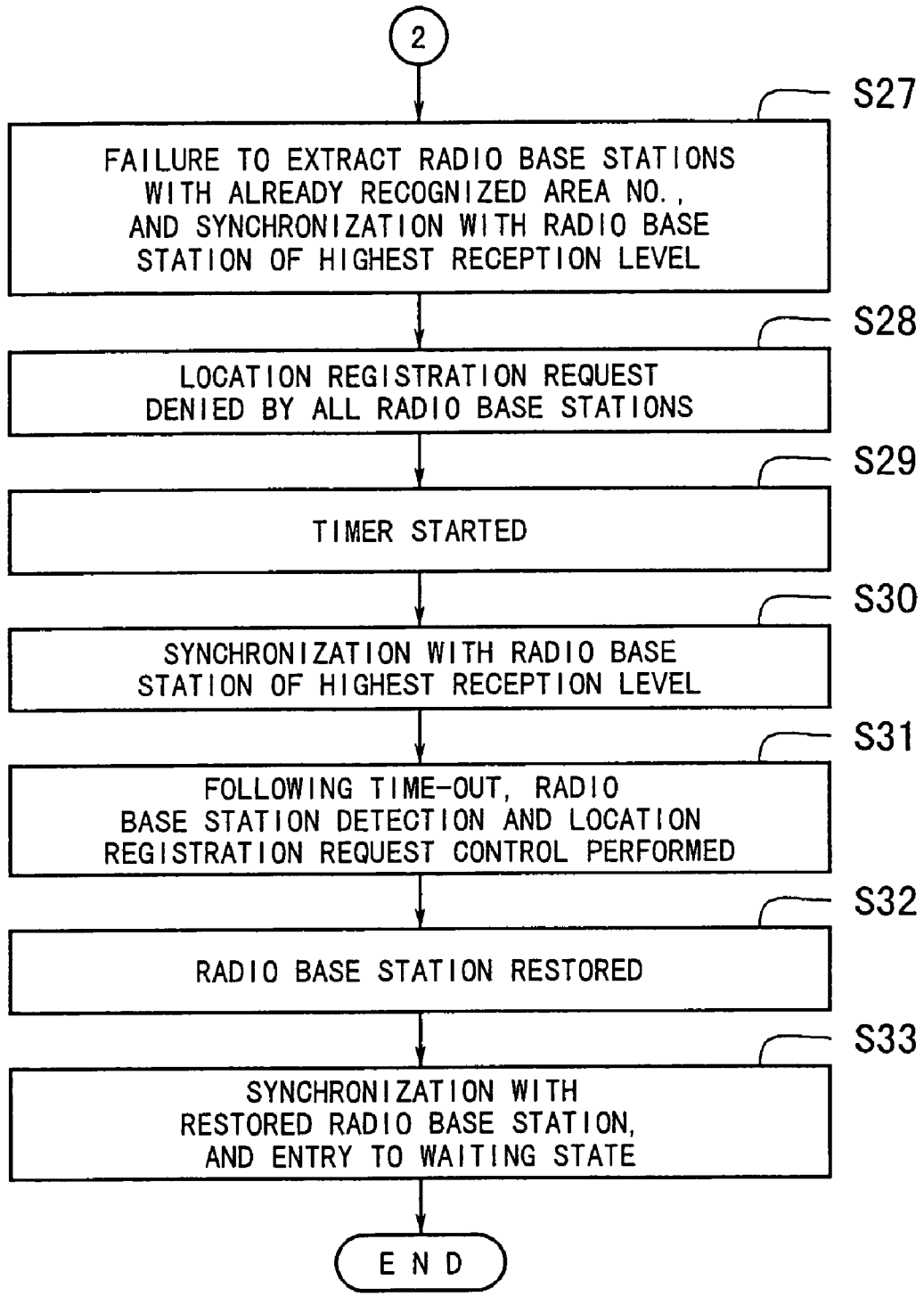
FIG. 12 is a flowchart showing the operation procedure of the subscriber unit.

FIGS. 11 and 12 are flowcharts illustrating an operation procedure of the subscriber unit 1. The operation described below is based on the assumptions explained with reference to FIGS. 9 and 10.

[S20] When the power supply to the subscriber unit 1 is switched on, the subscriber unit enters the continuous receive mode for 100 ms. During the continuous receive mode, the radio base station detecting means 1*a* detects IDs of radio base stations from which radio wave can be received. In this case, the four IDs of the radio base stations 11, 21, 31 and 41 are detected and stored.

[S21] The synchronization control means 1*d* establishes synchroneity with the radio base station 31 of highest reception level among the detected radio base stations 11, 21, 31 and 41.

[S22] The area number recognizing means 1*b* performs control for the recognition of the area number of radio base stations of which location registration is permitted (operation similar to Step S3 in FIG. 7 is performed). In this case, the area number recognizing means judges the radio base station 41 to be inside the area and recognizes its area number 40.

The area number 40 and the ID of the radio base station 41 are stored in the nonvolatile memory in a manner correlated with each other.

[S23] The radio base station extracting means 1*c* extracts the radio base station 41 having the stored area number 40, from the radio base stations 11, 21, 31 and 41 with the detected IDs.

[S24] The synchronization control means 1*d* establishes synchroneity with the extracted radio base station 41, whereupon the subscriber unit enters the waiting state.

[S25] If, during the waiting state, the radio base station 41 stops transmitting radio wave, the subscriber unit 1 becomes out of synchronism with respect to the radio base station 41.

[S26] The subscriber unit 1 switches to the continuous receive mode, so that the radio base station detecting means 1*a* again detects IDs of the radio base stations from which radio wave can be received. In this case, the radio base stations 11, 21 and 31 are detected.

[S27] The radio base station extracting means 1*c* tries to extract the radio base station 41 with the area number 40 which was already recognized and stored in Step S22, from the radio base stations 11, 21 and 31 with the detected IDs, but the extraction ends in failure. Accordingly, the synchronization control means 1*d* establishes synchroneity with the radio base station 31 of highest reception level among the radio base stations 11, 21 and 31.

[S28] The area number recognizing means 1*b* performs control for the recognition of the area number of radio base stations of which location registration is permitted. Namely, the area number recognizing means successively makes a location registration request to the radio base stations 31, 21 and 11 in descending order of reception level, but in this case all requests are denied.

[S29] Since there is no radio base station of which location registration is permitted, the timer control means 1*e* starts the timer (to measure, e.g., 100 seconds).

[S30] While the timer is in operation, the synchronization control means 1*d* maintains synchroneity with the radio base station 31 of highest reception level among the radio base stations 11, 21 and 31.

[S31] After time-out is signaled by the timer, the aforementioned detection of radio base stations and location registration request control are carried out again.

[S32] The radio base station 41, which has stopped transmitting radio wave, is restored.

[S33] The restored radio base station 41 can be found among the radio base stations detected in the continuous receive mode following the time-out. Accordingly, synchroneity with the original radio base station 41 is again established (operations similar to Steps S20 to S24 are performed), and the subscriber unit enters the waiting state.

As described above, the subscriber unit 1 according to the present invention includes the timer control means 1e and is constructed such that it maintains synchroneity with a radio base station of highest reception level among the detected radio base stations while the timer is in operation, and automatically recognizes a radio base station to which it should be reconnected after time-out is signaled.

Thus, even in cases where one and only radio base station of which location registration is permitted in an area once stops transmitting radio wave and is thereafter restored, the subscriber unit can again establish synchroneity with the restored radio base station.

Figure 13:
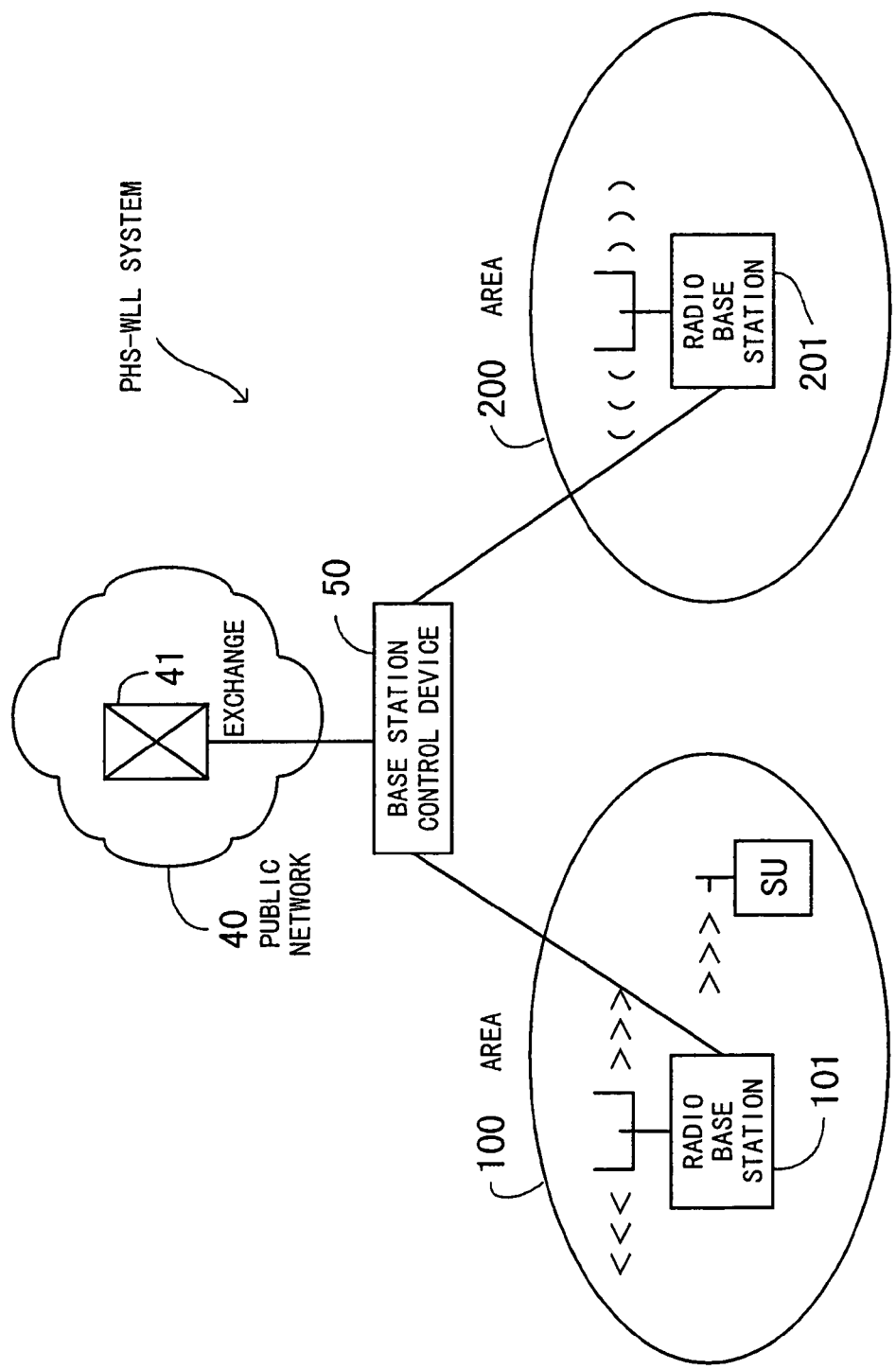
FIG. 13 is a diagram illustrating a problem with the conventional PHS-WLL system encountered when a radio base station is additionally installed at a location adjacent to the subscriber unit.
Figure 14:
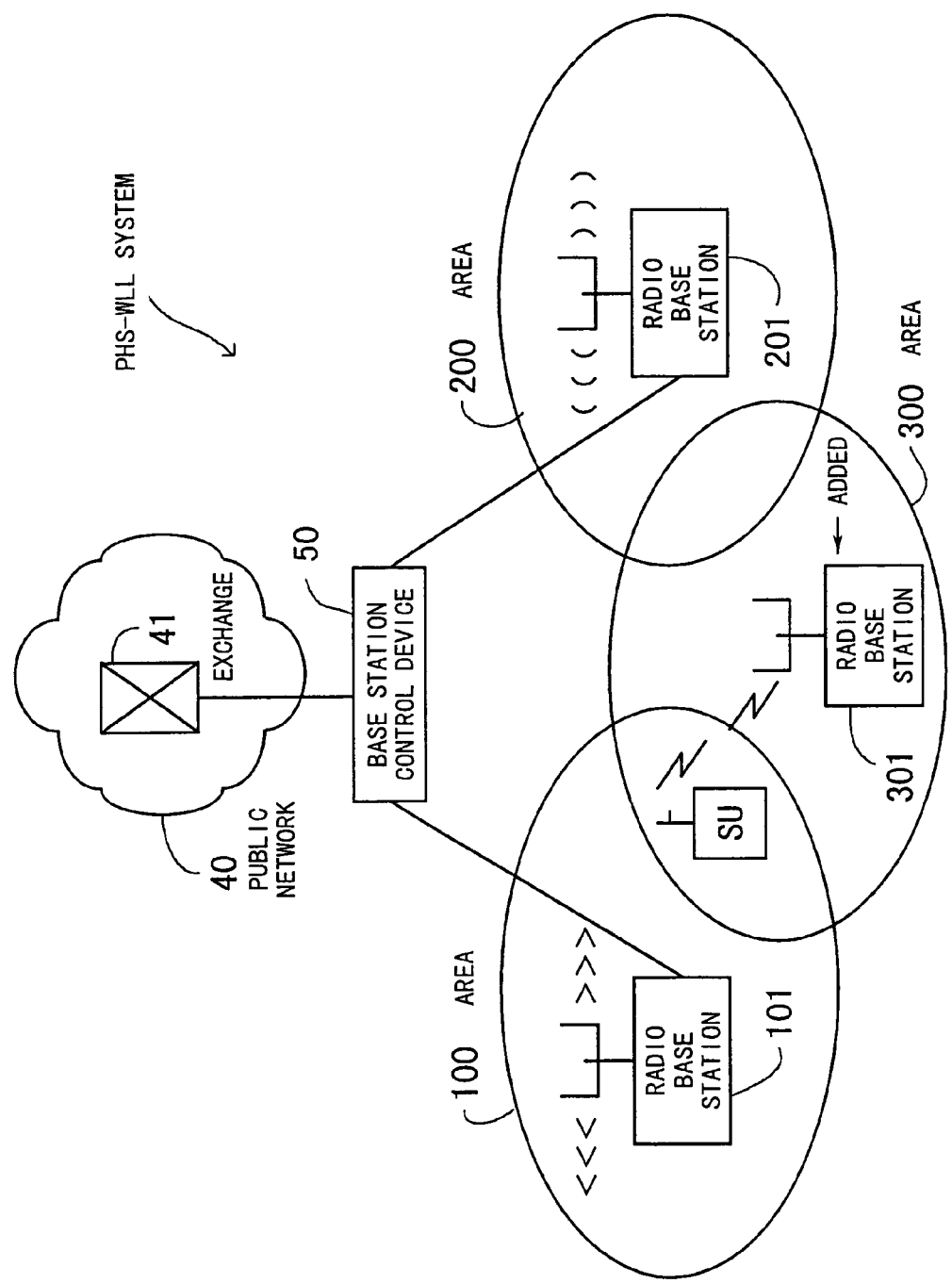
FIG. 14 is a diagram similarly illustrating the problem with the conventional PHS-WLL system encountered when a radio base station is additionally installed at a location adjacent to the subscriber unit.

The following describes a problem which arises when a radio base station is additionally installed at a location adjacent to a subscriber unit. FIGS. 13 and 14 illustrate a problem with the conventional PHS-WLL system encountered when a radio base station is additionally installed at a location adjacent to the subscriber unit.

In FIG. 13, the PHS-WLL system comprises a public network 40 including an exchange 41, a base station control device 50, an area 100 including a radio base station 101 and a subscriber unit SU, and an area 200 including a radio base station 201.

The base station control device 50 connects the exchange 41 and each of the radio base stations 101 and 201 by a wireline link, and the subscriber unit SU is connected to the radio base station 101 by a wireless link. The subscriber unit SU maintains synchroneity with the radio base station 101.

FIG. 14 shows a state in which a radio base station has been additionally installed at a location adjacent to the subscriber unit SU. An added radio base station 301 is included in an area 300. For the subscriber unit SU, the level of radio wave received from the radio base station 301 is higher than that received from the radio base station 101, and accordingly, the subscriber unit SU establishes synchroneity with the radio base station 301.

This brings about a situation where subscribers whom the radio base station 301 should originally accommodate cannot be fully serviced.

Figure 15:
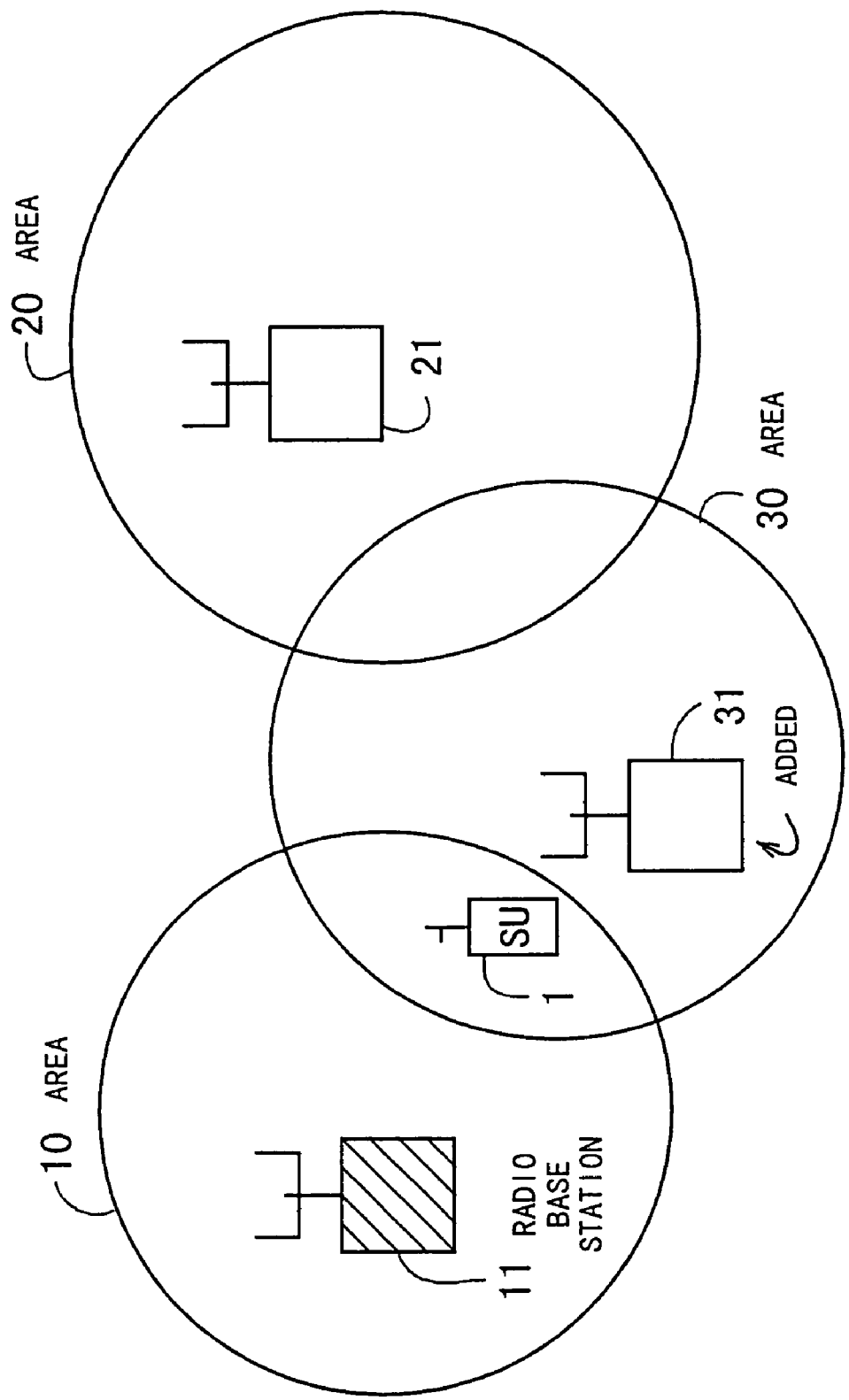
FIG. 15 is a diagram showing an arrangement of areas in which the subscriber unit is located.

The following describes how the subscriber unit 1 according to the present invention operates when a radio base station is additionally installed at a location adjacent thereto. FIG. 15 shows an arrangement of areas in which the subscriber unit 1 is located. The area 10 includes the radio base station 11 and the subscriber unit 1, and the subscriber unit 1 maintains synchroneity with the radio base station 11. The area 20 includes the radio base station 21.

A radio base station 31 is additionally installed at a location adjacent to the subscriber unit 1 and is included in an area 30.

Figure 16:
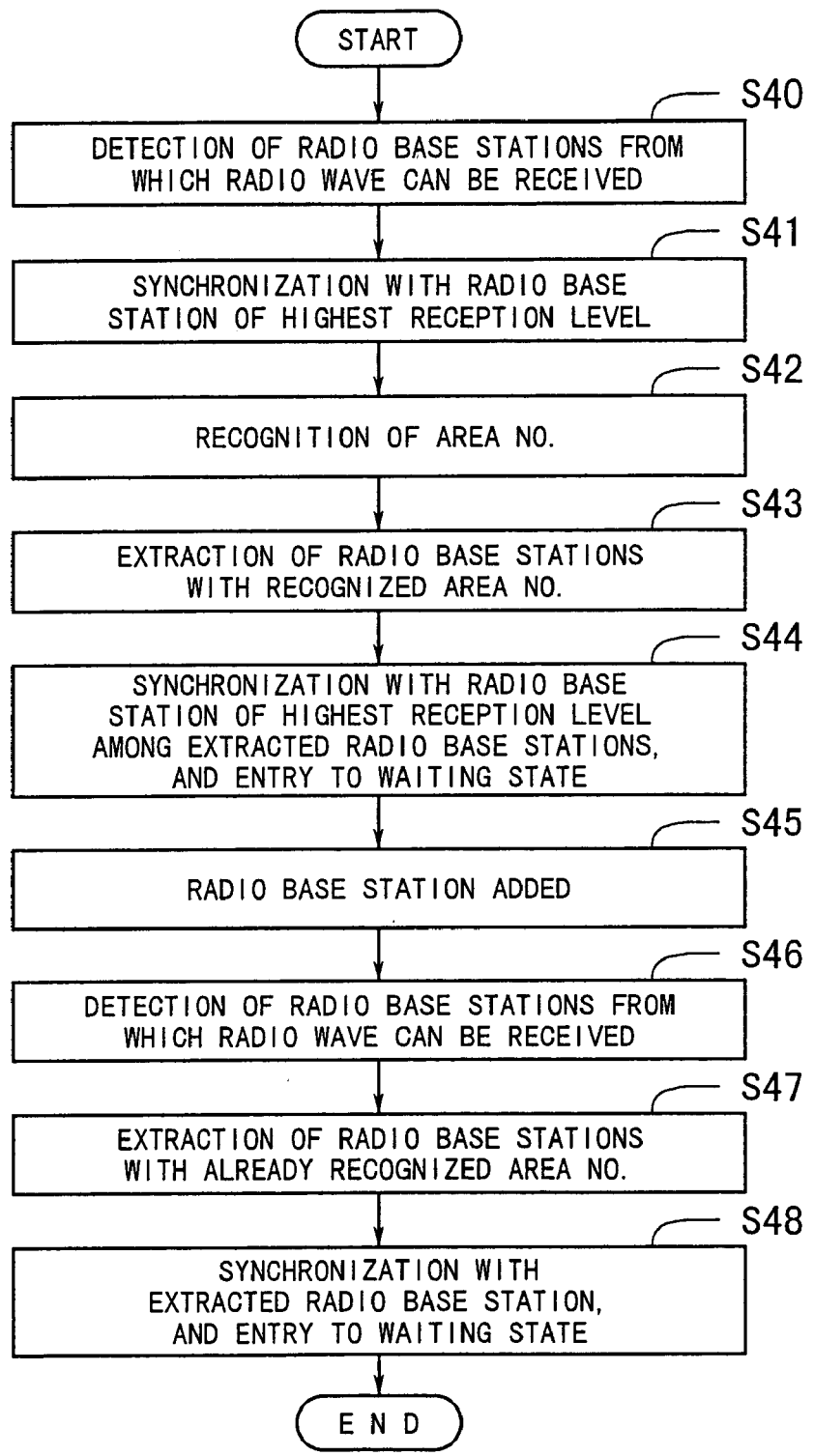
FIG. 16 is a flowchart showing an operation procedure of the subscriber unit.

FIG. 16 is a flowchart illustrating an operation procedure of the subscriber unit 1. The operation described below is based on the assumption explained with reference to FIG. 15.

[S40] When the power supply to the subscriber unit 1 is switched on, the subscriber unit enters the continues receive mode for 100 ms. During the continuous receive mode, the radio base station detecting means 1a detects IDs of radio base stations from which radio wave can be received. In this case, the two IDs of the radio base stations 11 and 21 are detected and stored.

[S41] The synchronization control means 1d establishes synchroneity with the detected radio base station 11.

[S42] The area number recognizing means 1b performs control for the recognition of the area number of radio base stations of which location registration is permitted. In this case, the radio base station 11 is judged to be inside the area and the area number 10 thereof is recognized.

The area number 10 and the ID of the radio base station 11 are stored in the nonvolatile memory in a manner correlated with each other.

[S43] The radio base station extracting means 1c extracts the radio base station 11 having the stored area number 10 from the radio base stations 11 and 21 with the detected IDs.

[S44] The synchronization control means 1d establishes synchroneity with the extracted radio base station 11, whereupon the subscriber unit enters the waiting state.

[S45] It is assumed that, in the waiting state, an incoming call is received, in which case the subscriber unit 1 enters a state of telephone conversation with the calling unit via the radio base station 11. Also, it is assumed that the radio base station 31 is additionally installed at a location adjacent to the subscriber unit 1.

[S46] After the telephone conversation ends, the a subscriber unit 1 enters the continuous receive mode, whereupon the radio base station detecting means 1a again detects IDs of the radio base stations from which radio wave can be received. Specifically, the radio base stations 11, 21 and 31 are detected.

[S47] The radio base station extracting means 1c extracts the radio base station 11 having the area number 10 already recognized and stored in Step S42, from the radio base stations 11, 21 and 31 with the detected IDs.

[S48] The synchronization control means 1d establishes synchroneity with the radio base station 11, whereupon the subscriber unit enters the waiting state.

As described above, the subscriber unit 1 according to the present invention is constructed so as to be able to automatically recognize the radio base station to which it should be connected. Accordingly, even in cases where a radio base station is additionally installed at a location adjacent to the subscriber unit, the subscriber unit can establish synchroneity with that radio base station to which it should originally be connected.

Figure 17:
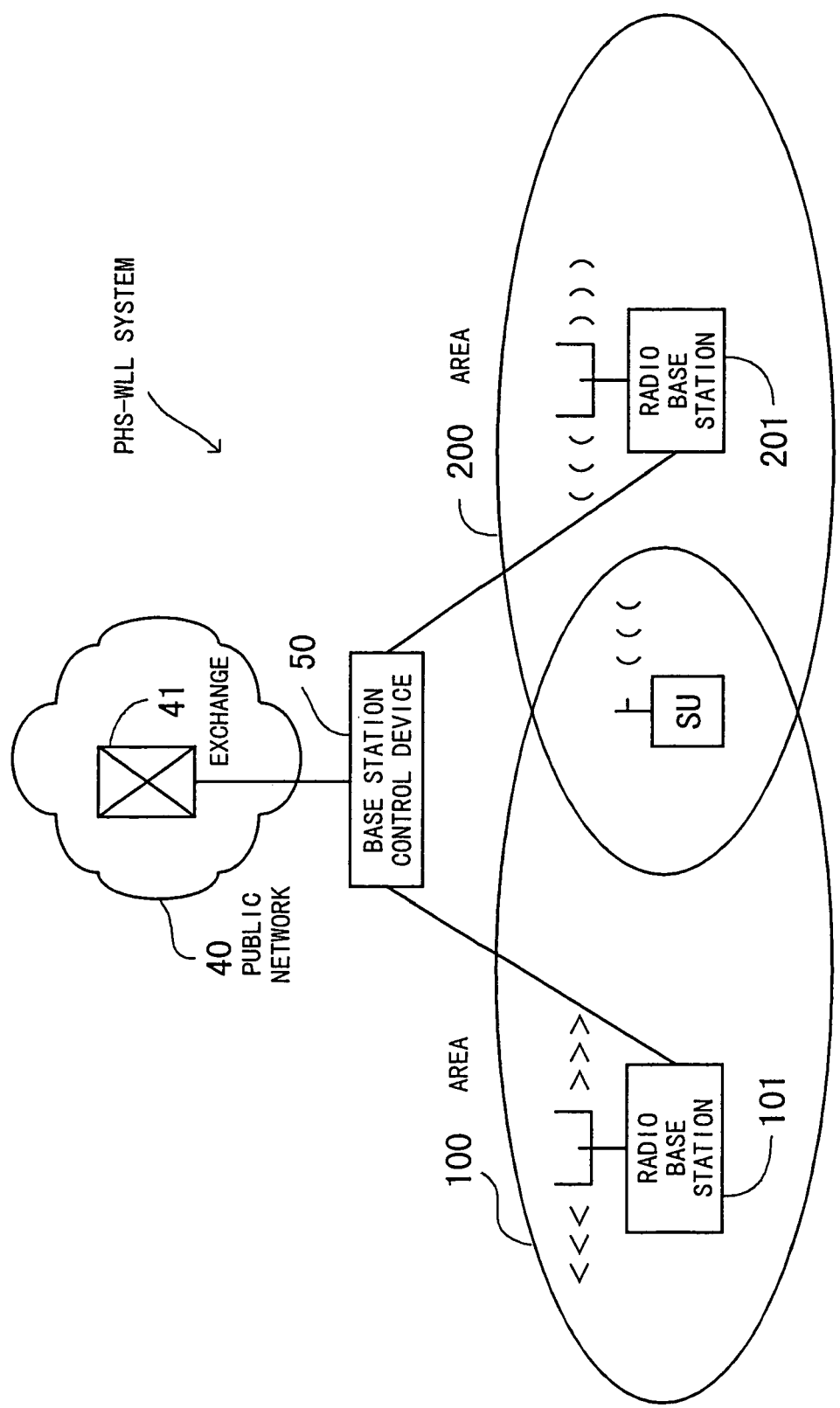
FIG. 17 is a diagram illustrating a problem with the conventional PHS-WLL system encountered when area numbers are rearranged.
Figure 18:
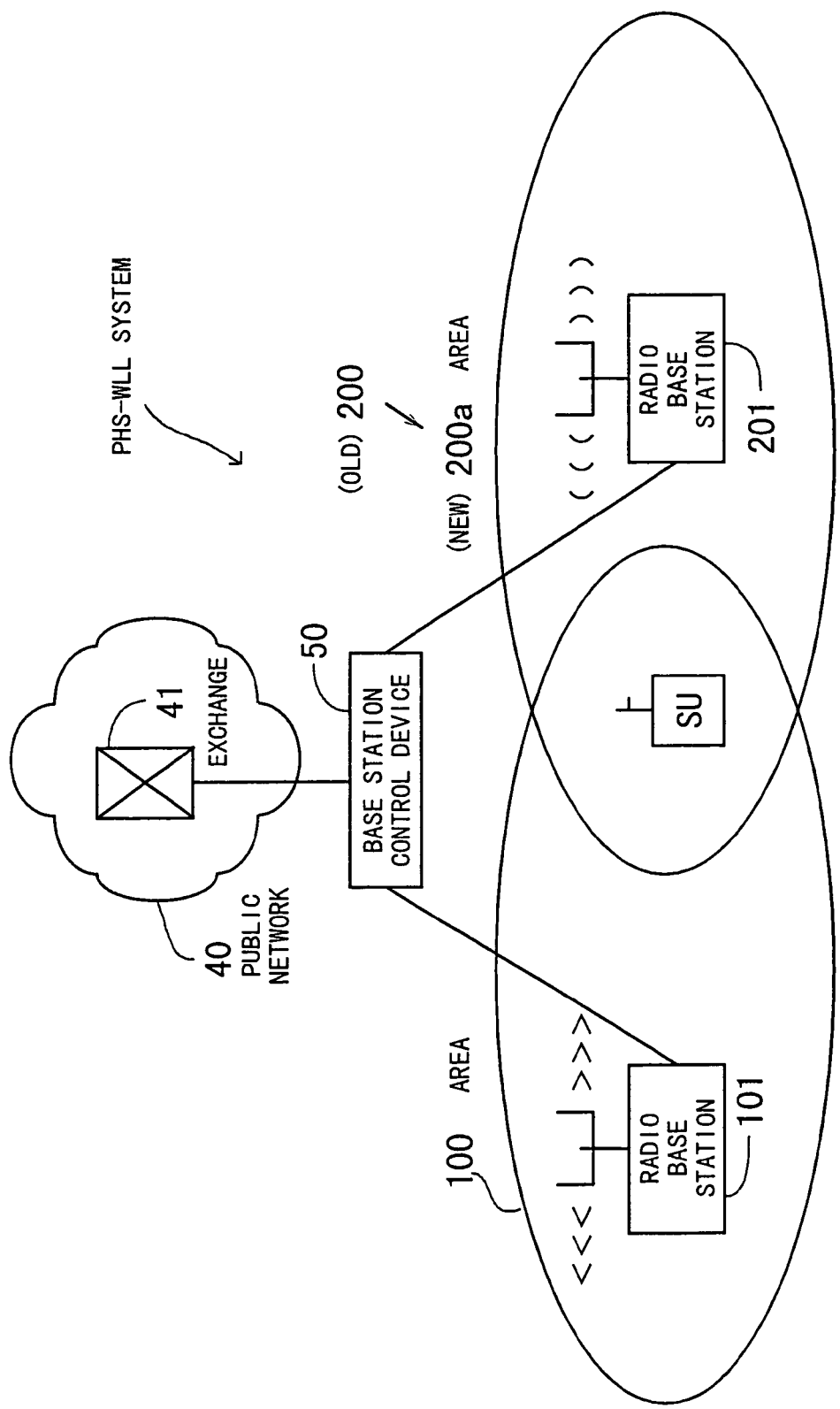
FIG. 18 is a diagram similarly illustrating the problem with the conventional PHS-WLL system encountered when the area numbers are rearranged.

The following describes a problem which arises when the area numbers are rearranged (reassigned). FIGS. 17 and 18 illustrate the problem with the conventional PHS-WLL system encountered when the area numbers are rearranged.

In FIG. 17, the PHS-WLL system comprises a public network 40 including an exchange 41, a base station control device 50, an area 100 including a radio base station 101, and an area 200 including a radio base station 201 and a subscriber unit SU.

The base station control device 50 connects the exchange 41 and each of the radio base stations 101 and 201 by a wireline link, and the subscriber unit SU is connected to the radio base station 201 by a wireless link. The figure shows a state in which the subscriber unit SU maintains synchroneity with the radio base station 201.

FIG. 18 shows a state in which an area number has been changed. Specifically, the area number 200 has been changed to an area number 200a (because of additional installation of a radio base station, for example, the area number has been reassigned).

Since the subscriber unit SU stores the area number 200 indicating the area of the radio base station 201 which has accepted location registration, it is unable to establish synchroneity with the radio base station 201, failing to locate same.

If the radio wave which the subscriber unit SU receives from the radio base station 101 is higher in level than the radio wave which the subscriber unit receives from the radio base station 201, then the subscriber unit SU continues sending a location registration request to the radio base station 101, with the result that the location registration cannot be terminated.

Figure 19:
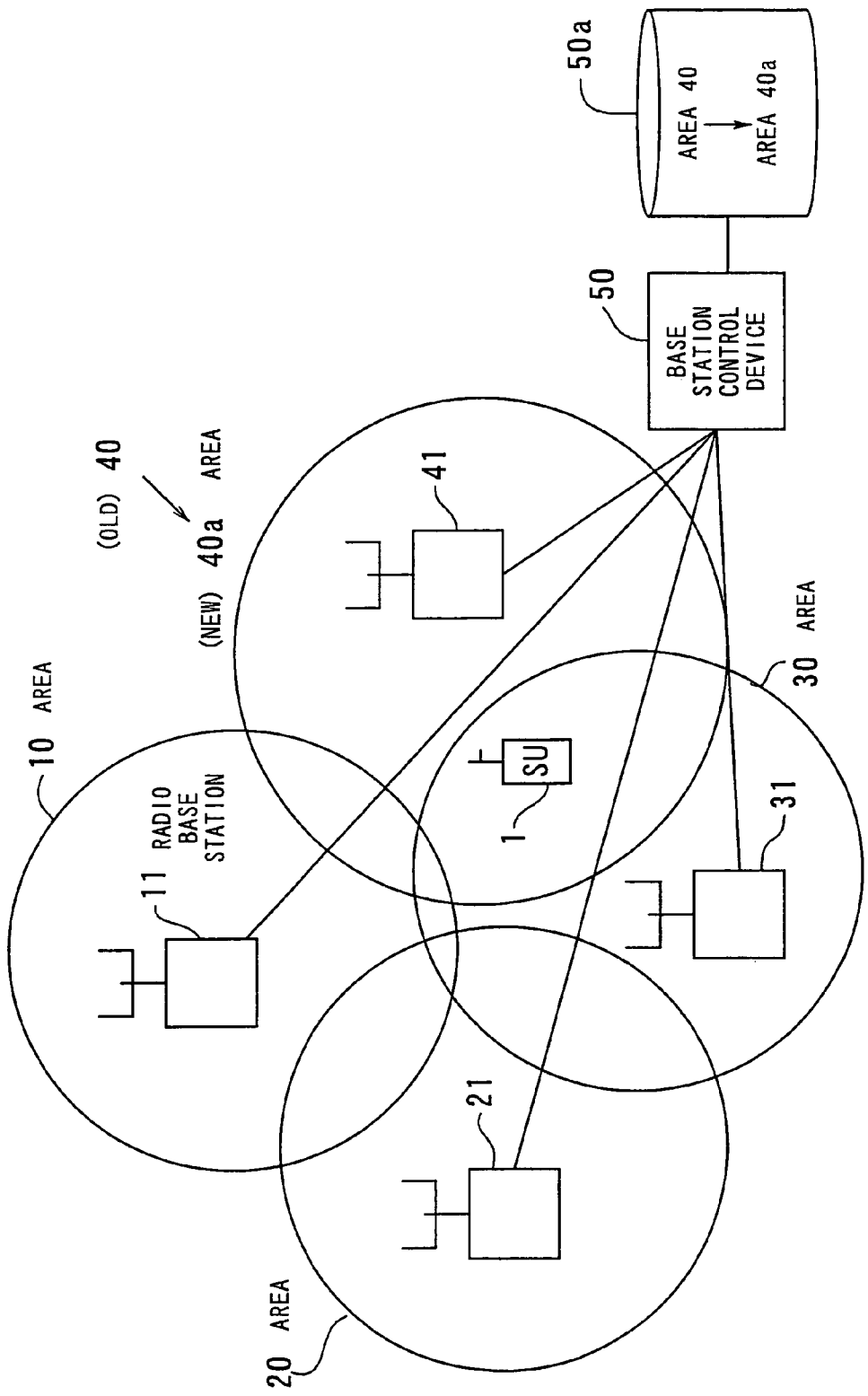
FIG. 19 is a diagram showing an arrangement of areas in which the subscriber unit is located.

The following describes how the subscriber unit 1 according to the present invention operates when the area numbers are rearranged. FIG. 19 shows an arrangement of areas in which the subscriber unit 1 is located. The areas 10 to 30 include the radio base stations 11 to 31, respectively.

The area 40 includes the radio base station 41 and the subscriber unit 1 maintaining synchroneity therewith, and it is assumed that the area 40 is thereafter changed to an area 40a due to reassignment of the area numbers.

The change thus made is stored in a database 50a connected to the base station control device 50.

Figure 20:
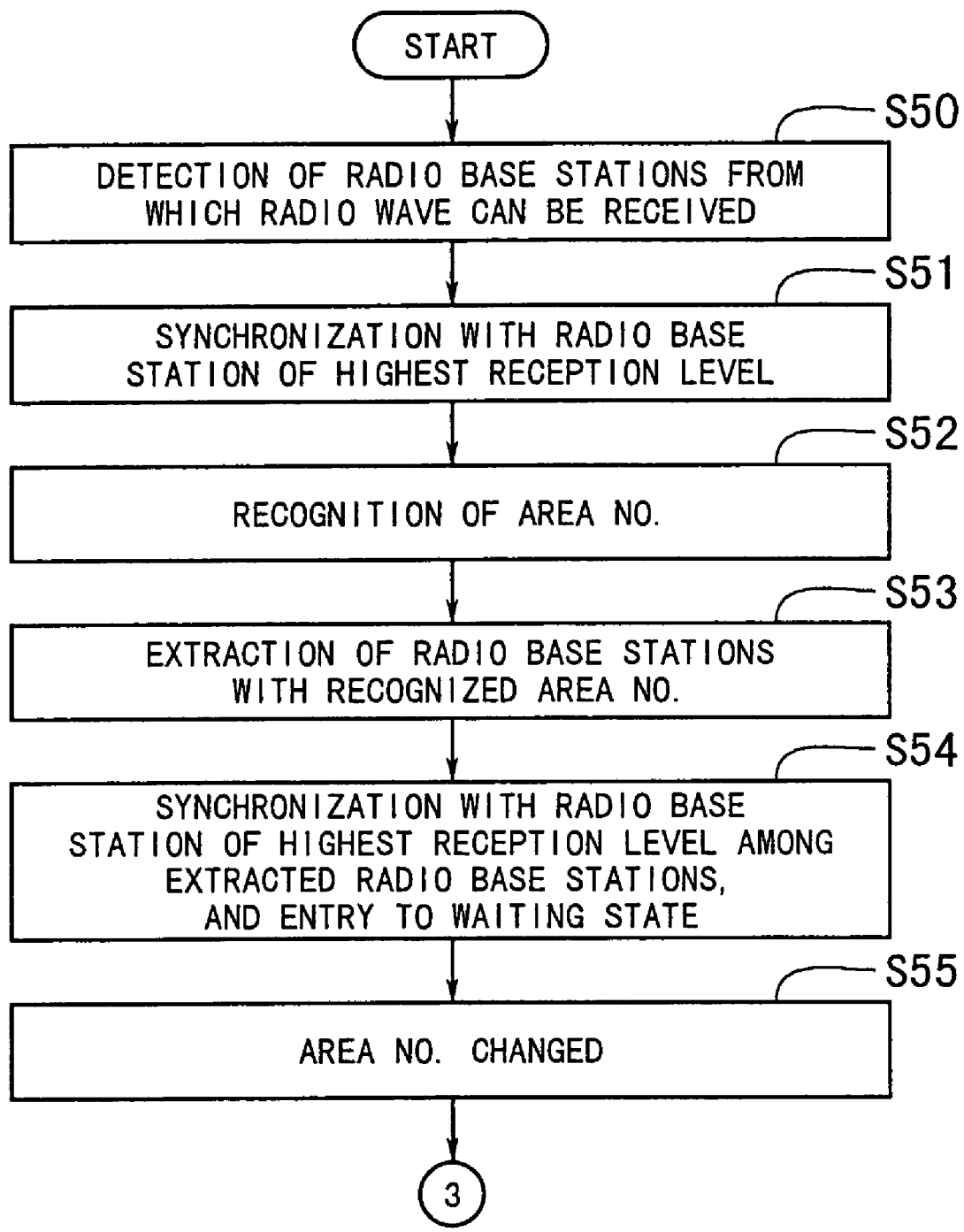
FIG. 20 is a flowchart showing an operation procedure of the subscriber unit.
Figure 21:
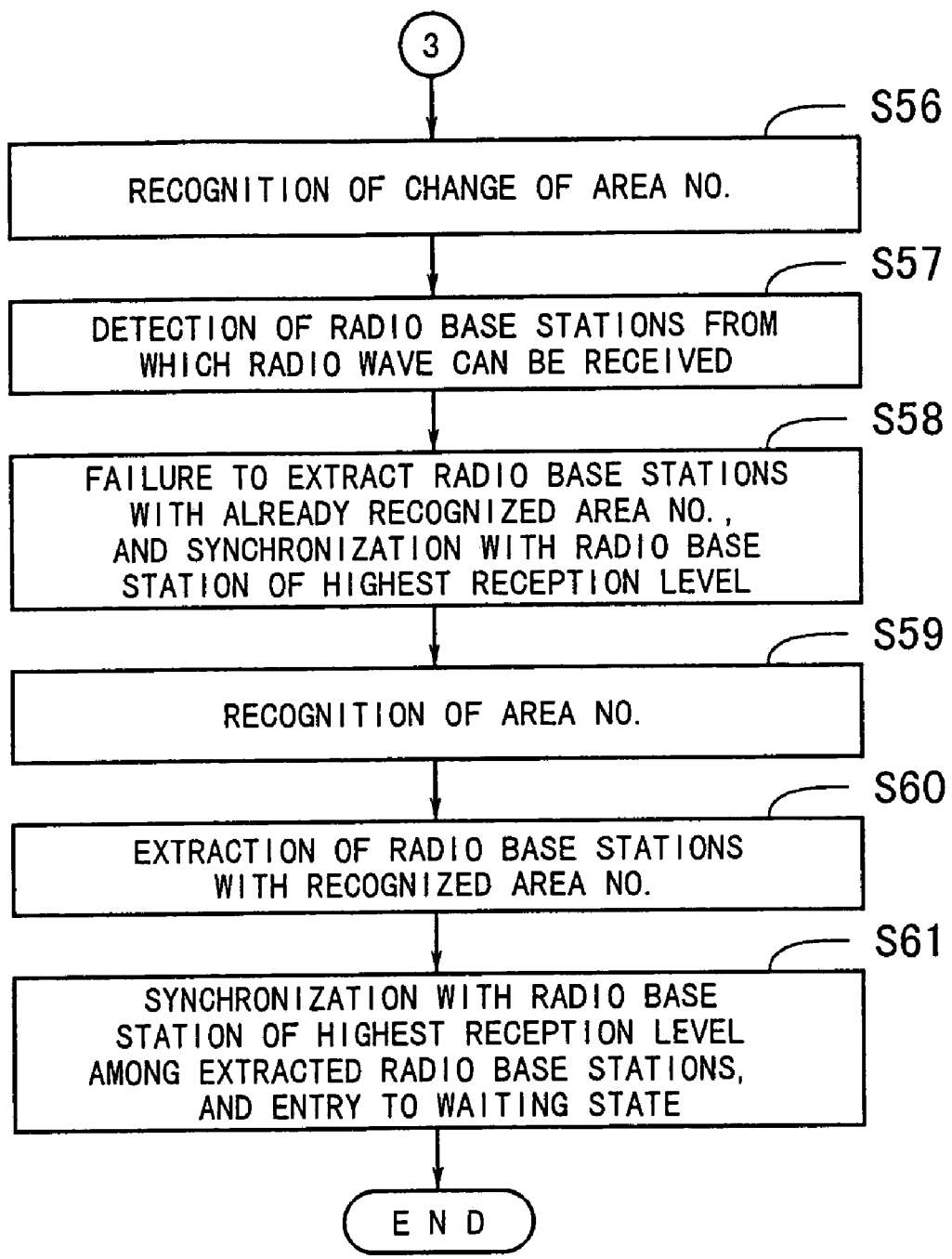
FIG. 21 is a flowchart showing the operation procedure of the subscriber unit.

FIGS. 20 and 21 are flowcharts illustrating an operation procedure of the subscriber unit 1. The operation described below is based on the assumption explained with reference to FIG. 19.

[S50] When the power supply to the subscriber unit 1 is switched on, the subscriber unit enters the continues receive mode for 100 ms. During the continuous receive mode, the radio base station detecting means 1a detects IDs of radio base stations from which radio wave can be received. In this case, the four IDs of the radio base stations 11, 21, 31 and 41 are detected and stored.

[S51] The synchronization control means 1d establishes synchroneity with the detected radio base station 41.

[S52] The area number recognizing means 1b performs control for the recognition of the area number of radio base stations of which location registration is permitted. In this case, the radio base station 41 is judged to be inside the area and its area number 40 is recognized.

The area number 40 and the ID of the radio base station 41 are stored in the nonvolatile memory in a manner correlated with each other.

[S53] The radio base station extracting means 1c extracts the radio base station 41 having the stored area number 40 from the radio base stations 11, 21, 31 and 41 with the detected IDs.

[S54] The synchronization control means 1d establishes synchroneity with the extracted radio base station 41, whereupon the subscriber unit enters the waiting state.

[S55] It is assumed that, in the waiting state, the area number is changed from 40 to 40a.

[S56] The area number change control means 1f recognizes the change of the area number on a PCH (paging channel) via which information is received all the time during the waiting state.

Namely, a discrepancy between the area number in the PCH information and the stored area number is recognized. More specifically, such discrepancy can be recognized by slot information CS-ID of the PCH.

[S57] The subscriber unit 1 enters the continuous receive mode, whereupon the radio base station detecting means 1a again detects IDs of the radio base stations from which radio wave can be received. Specifically, the radio base stations 11, 21, 31 and 41 are detected.

[S58] The radio base station extracting means 1c tries to extract the radio base station 41 having the area number 40 already recognized and stored in Step S52, from the radio base stations 11, 21, 31 and 41 with the detected IDs, but the extraction ends in failure. The synchronization control means 1d establishes synchroneity with the radio base station 41 of highest reception level among the radio base stations 11, 21, 31 and 41.

[S59] The area number recognizing means 1b performs control for the recognition of the area number of radio base stations of which location registration is permitted. In this control procedure, first, a location registration request is sent to the radio base station 41 of highest reception level.

In this case, the radio base station 41 is judged to be inside the area and its area number 40a is recognized.

The area number 40a and the ID of the radio base station 41 are stored in the nonvolatile memory in a manner correlated with each other.

[S60] The radio base station extracting means 1c extracts the radio base station 41 having the stored area number 40a from among the radio base stations 11, 21, 31 and 41 with the detected IDs.

[S61] The synchronization control means 1d establishes synchroneity with the extracted radio base station 41, whereupon the subscriber unit enters the waiting state.

Figure 22:
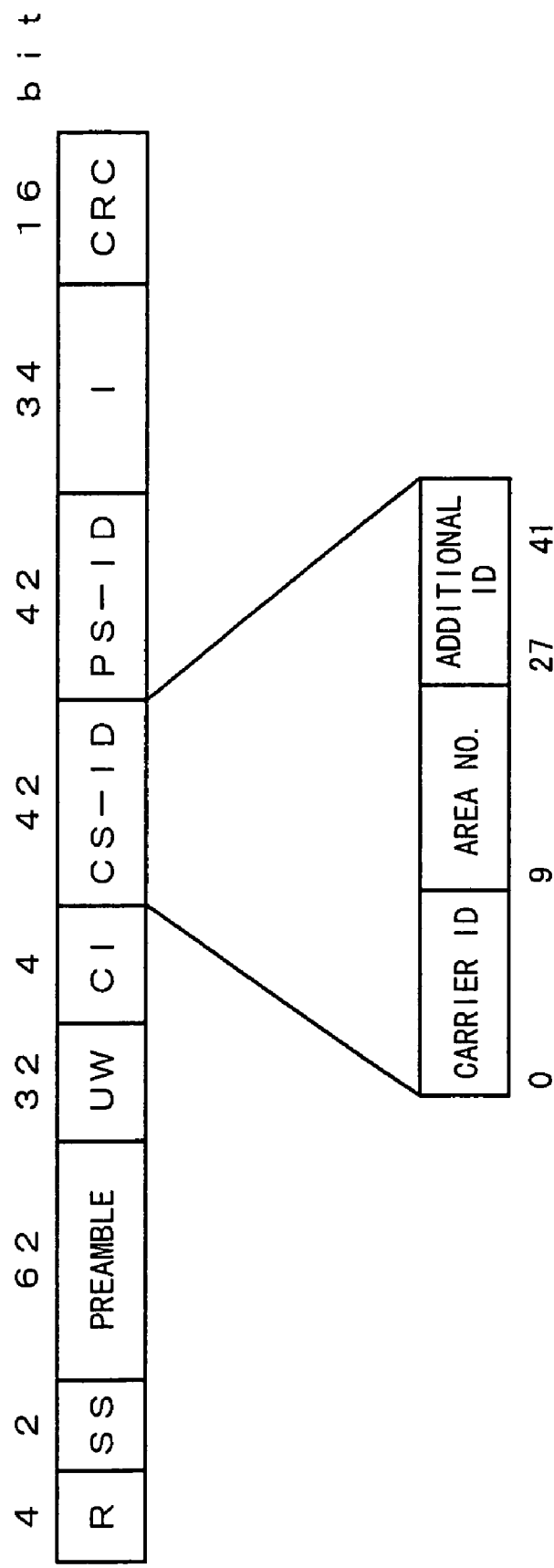
FIG. 22 is a diagram showing a PCH slot arrangement.

FIG. 22 shows an arrangement of PCH slots. In the figure, R denotes transient response ramp bits consisting of 4 bits, SS denotes a start symbol consisting of 2 bits, UW denotes a unique word (synchronization bits) consisting of 32 bits, CI denotes a channel type consisting of 4 bits, CS-ID denotes a radio base station ID consisting of 42 bits, PS-ID denotes a subscriber unit ID consisting of 42 bits, I denotes information consisting of 34 bits, and CRC denotes a cyclically generated code consisting of 16 bits.

The CS-ID consists of a carrier ID (9 bits), an area number (18 bits), and an additional ID (15 bits).

As described above, the subscriber unit 1 according to the present invention includes the area number change control means 1f to cope with rearrangement of area numbers. Thus, even in cases where the area number has been changed, the subscriber unit can establish synchroneity with the radio base station to which it should originally be connected.

In the change control of the area number change control means 1f described above, after a change of the area number is recognized, the mode is switched to the continuous receive mode. Alternatively, the stored area number may be rewritten upon recognition of a change of the area number, followed by switching to the continuous receive mode. In this case, it is unnecessary to again perform the area number recognition control.

Figure 23:
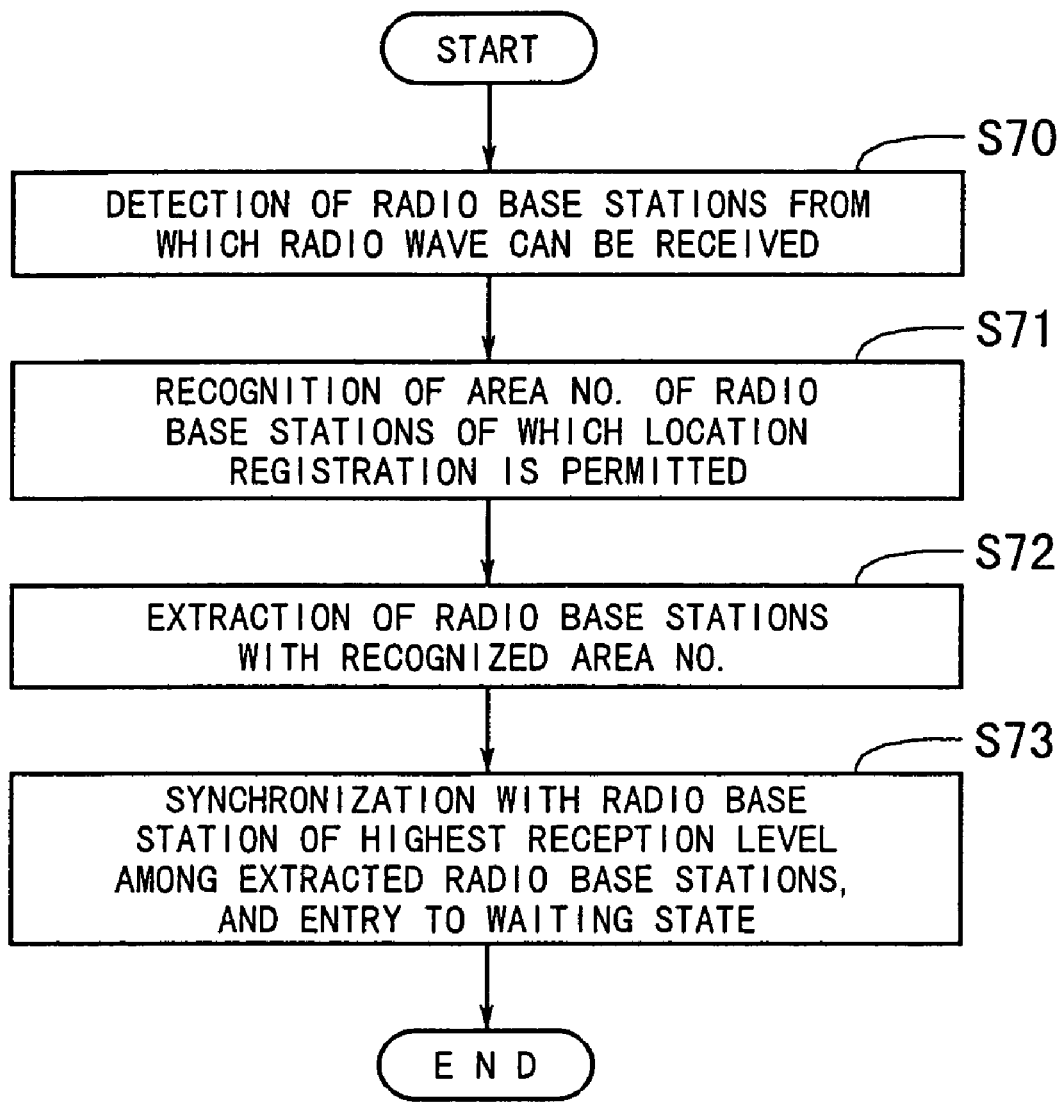
FIG. 23 is a flowchart showing a procedure of a radio base station recognition method according to the present invention.
Figure 24:
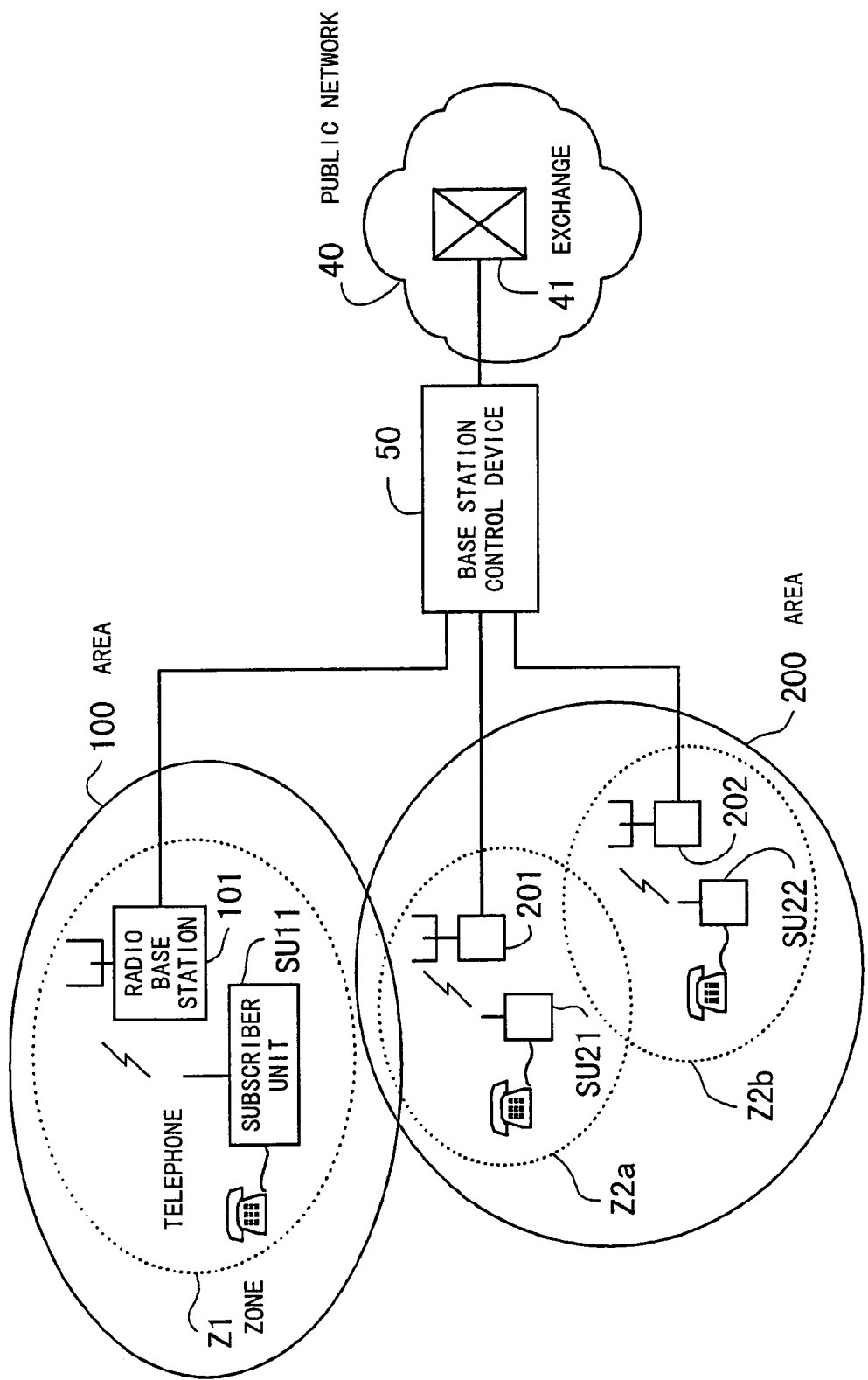
FIG. 24 is a diagram showing a WLL system configuration.

A radio base station recognition method according to the present invention will be now described. FIG. 23 is a flowchart illustrating a procedure of the radio base station recognition method according to the present invention.

[S70] In the continuous receive mode, radio base stations from which radio wave can be received are detected.

[S71] An area number of radio base stations of which location registration is permitted is recognized.

[S72] Radio base stations having the recognized area number are extracted from the detected radio base stations.

[S73] Synchroneity is established with a radio base station of highest reception level among the extracted radio base stations.

As described above, according to the subscriber unit 1 and the radio base station recognition method of the present invention, radio base stations with an area number with respect to which location registration is permitted are extracted from radio base stations with detected identification numbers, and synchroneity is established with the radio base station of highest reception level among the extracted radio base stations.

Accordingly, even in cases where a radio base station stops transmitting radio wave and is thereafter restored, or a radio base station is additionally installed or is removed, or the area numbers are rearranged, the subscriber unit can automatically recognize the most serviceable radio base station to which it should be connected, whereby satisfactory speech quality is ensured and services can be provided steadily.

As described above, the subscriber unit according to the present invention extracts radio base stations with an area number with respect to which location registration is permitted, from radio base stations with detected identification numbers, and synchroneity is established with the radio base station of highest reception level among the extracted radio base stations. The subscriber unit can therefore automatically recognize the most serviceable radio base station of which the use is permitted by the network side.

In the radio base station recognition method according to the present invention, radio base stations with an area number with respect to which location registration is permitted are extracted from radio base stations with detected identification numbers, and synchroneity is established with the radio base station of highest reception level among the extracted radio base stations. This makes it possible to automatically recognize the most serviceable radio base station of which the use is permitted by the network side.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A subscriber unit for performing radio communication at a fixed location, comprising:
   radio base station detecting means for detecting, in a continuous receive mode, radio base stations from which a radio wave can be received;
   area number recognizing means for recognizing an area number of radio base stations of which location registration is permitted;
   radio base station extracting means for extracting radio base stations with said area number from among the detected radio base stations; and
synchronization control means for establishing synchroneity with a radio base station of highest reception level among the extracted radio base stations, wherein
said area number recognizing means makes a location registration request to the detected radio base stations, judges a radio base station denying the location registration request to be outside an area, judges a radio base station accepting the location registration request to be inside an area, and recognizes an area number of the radio base station which has accepted the location registration request.

2. The subscriber unit according to claim 1, wherein said radio base station detecting means detects identification numbers of radio base stations from which radio wave can be received.

3. The subscriber unit according to claim 1, wherein said area number recognizing means stores the area number and identification numbers of radio base stations in a nonvolatile memory.

4. The subscriber unit according to claim 1, wherein, when mode is switched to the continuous receive mode after the recognition of the area number by said area number recognizing means, said radio base station extracting means extracts radio base stations with the already recognized area number from among radio base stations newly detected by said radio base station detecting means.

5. The subscriber unit according to claim 1, wherein said synchronization control means maintains synchroneity with a radio base station of highest reception level among the radio base stations detected by said radio base station detecting means before establishing synchroneity with the radio base stations of which location registration is permitted and of which reception level is highest.

6. The subscriber unit according to claim 1, further comprising timer control means for starting a timer when there exists no radio base stations of which location registration is permitted.

7. The subscriber unit according to claim 6, wherein said synchronization control means maintains synchroneity with a radio base station of highest reception level among the detected radio base stations until the timer signals time-out.

8. The subscriber unit according to claim 1, further comprising area number change control means for controlling change of the area number recognized by said area number recognizing means upon recognition of change of the area number.

9. A radio base station recognition method which enables a subscriber unit for performing radio communication at a fixed location to recognize a radio base station, comprising:
   detecting, in a continuous receive mode, radio base stations from which a radio wave can be received;
   recognizing an area number of radio base stations of which location registration is permitted;
   extracting radio base stations with said area number from among the detected radio base stations; and
establishing synchroneity with a radio base station of highest reception level among the extracted radio base stations, wherein
said area number recognizing makes a location registration request to the detected radio base stations, and further including judging a radio base station denying the location registration request to be outside an area, judging a radio base station accepting the location registration request to be inside an area, and recognizing an area number of the radio base station which has accepted the location registration request.

10. A subscriber unit used in a radio communication system including a first radio base station and a second radio base station, and where a location registration was previously permitted via the first radio base station for the subscriber unit and the location registration was previously denied via the second radio base station for the subscriber unit, said subscriber unit comprising:
   a memorizing unit for memorizing identification information of the first radio base station;
   radio base station detecting means for detecting radio base stations from which radio waves can be received including the first and second radio base stations;
   extracting means for extracting the first radio base station from among the detected radio base stations based on the identification information memorized in the memorizing unit; and
   synchronization control means for establishing synchronicity with the first radio base station without trying to establish synchronicity with the second radio base station even though the second radio base station has a higher signal strength level.

11. The subscriber unit of claim 10, wherein said radio base station detecting means detecting the second radio base station, and said synchronization control means not tying to establish synchronicity with the second radio base station based on a previously denied location registration via the second radio base station for the subscriber unit.

* * * * *

UNITED STATES PATENT AND TRADEMARK OFFICE
CERTIFICATE OF CORRECTION

PATENT NO. : 6,990,085 B1
APPLICATION NO. : 09/394771
DATED : January 24, 2006
INVENTOR(S) : H. Matsuura It is certified that error appears in the above-identified patent and that said Letters Patent is hereby corrected as shown below:

On Title Page, Col. 1 Item (30), should read,

--        Foreign Application Priority Data

January 19, 1999 (JP) ................ 11-010285 --

Signed and Sealed this

Twenty-ninth Day of August, 2006

JON W. DUDAS
*Director of the United States Patent and Trademark Office*